United States Patent [19]

Adachi et al.

[11] Patent Number: 4,745,443

[45] Date of Patent: May 17, 1988

[54] COPYING APPARATUS

[75] Inventors: Hideki Adachi; Masahiro Tomosada, both of Kawasaki; Tadashi Suzuki, Yokohama; Naoyuki Ohki, Tokyo, all of Japan

[73] Assignee: Canon Kabushiki Kaisha, Tokyo, Japan

[21] Appl. No.: 943,854

[22] Filed: Dec. 22, 1986

Related U.S. Application Data

[63] Continuation of Ser. No. 732,840, May 10, 1985, abandoned.

[30] Foreign Application Priority Data

| | | | |
|---|---|---|---|
| May 15, 1984 | [JP] | Japan | 59-95484 |
| May 15, 1984 | [JP] | Japan | 59-95485 |
| May 15, 1984 | [JP] | Japan | 59-95486 |
| May 15, 1984 | [JP] | Japan | 59-95487 |
| May 15, 1984 | [JP] | Japan | 59-95491 |

[51] Int. Cl.[4] .................. G03B 27/52

[52] U.S. Cl. .................. 355/40; 355/14 R; 355/55; 355/61

[58] Field of Search .................. 355/3 R, 3 SH, 14 SH, 355/41, 75, 7, 55, 14 R, 6, 8, 14 C, 61, 40; 250/560; 356/383

[56] References Cited

U.S. PATENT DOCUMENTS

| | | | |
|---|---|---|---|
| 3,914,043 | 10/1975 | McVeigh | 355/4 |
| 4,417,805 | 11/1983 | Kishi | 355/7 X |
| 4,538,182 | 8/1985 | Saito et al. | 358/280 |
| 4,552,449 | 11/1985 | Wakamatsu et al. | 355/7 X |
| 4,579,445 | 4/1986 | Hasegawa | 355/14 R |
| 4,629,314 | 12/1986 | Yoshiura et al. | 355/55 |

*Primary Examiner*—Richard A. Wintercorn

*Attorney, Agent, or Firm*—Fitzpatrick, Cella, Harper & Scinto

[57] ABSTRACT

An analog copying apparatus for optically exposing an original and copying it onto an arbitrary copy area on a copy paper has an area designating function and comprises: an image area designating apparatus to designate an arbitrary area on the original; a copy area designating apparatus to designate an arbitrary area on the copy paper; and copying means for copying the image in the image area into the copy area. This copying apparatus further has: an original moving apparatus to move the original on an original plate; a lens moving apparatus to move a lens provided in the optical path in an arbitrary direction; a cassette moving apparatus to move a cassette in which the copy papers are enclosed; and a resist control apparatus to control the resist timing, wherein the image in the image area is copied onto the copy area by means of at least one of or a combination of a plurality of these apparatuses. A copy magnification may be calculated and set from the image area and copy area, and the image in the image area is copied onto the copy area on the basis of this magnification.

98 Claims, 23 Drawing Sheets

COPYING APPARATUS

This application is a continuation of application Ser. No. 732,840 filed May 10, 1985, now abandoned.

BACKGROUND OF THE INVENTION

1. Field of the Invention

The present invention relates to an analog copying apparatus having an area designating function.

2. Description of the Prior Art

In conventional analog copying apparatuses, in case of copying only an arbitrary area on an original, this area cannot be copied at an arbitrary position because the position on a copying paper where an image in that area is to be copied corresponds to the position in the designated area on the original.

In addition, when an arbitrary area on the original is designated, there is an annoyance such that the operator has to set the copying magnification and the size of the copy paper.

SUMMARY OF THE INVENTION

The present invention intends to eliminate the above-mentioned drawbacks.

It is an object of the invention to improve a copying apparatus.

Another object of the invention is to provide a copying apparatus which can copy an image in an arbitrary area on an original into an arbitrary area on a copy paper.

Still another object of the invention is to provide a copying apparatus which can designate an arbitrary area on an original and an arbitrary area on a copy paper and can obtain the copy magnification from these two areas.

Still another object of the invention is to provide a copying apparatus which can designate an arbitrary area on an original and an arbitrary area on a copy paper and can display the designated areas.

Still another object of the invention is to provide a copying apparatus which can designate an arbitrary area on a copy paper and a copy magnification and can obtain the size of original which can be copied.

Still another object of the invention is to provide a copying apparatus which can designate an arbitrary area on a copy paper and a copy magnification and can obtain the size of area on an original which can be copied.

Still another object of the invention is to provide a copying apparatus which can designate an arbitrary area on an original and a copy magnification and can obtain the size of area on a copy paper corresponding to them.

Still another object of the invention is to provide a copying apparatus which can designate an arbitrary area on an original and a copy magnification and can obtain the size of copy paper on which the copy can be performed.

Still another object of the invention is to provide an image forming apparatus which designates the color of image in an arbitrary area on an original.

Still another object of the invention is to provide an image forming apparatus which designates the color of image information and forms an image in an arbitrary area on an image forming member.

Other objects and features of the present invention will become apparent from the following detailed description and the appended claims with reference to the accompanying drawings.

DETAILED DESCRIPTION OF PREFERRED EMBODIMENTS

The present invention will now be described in detail hereinbelow with reference to the drawings.

Figure 1:
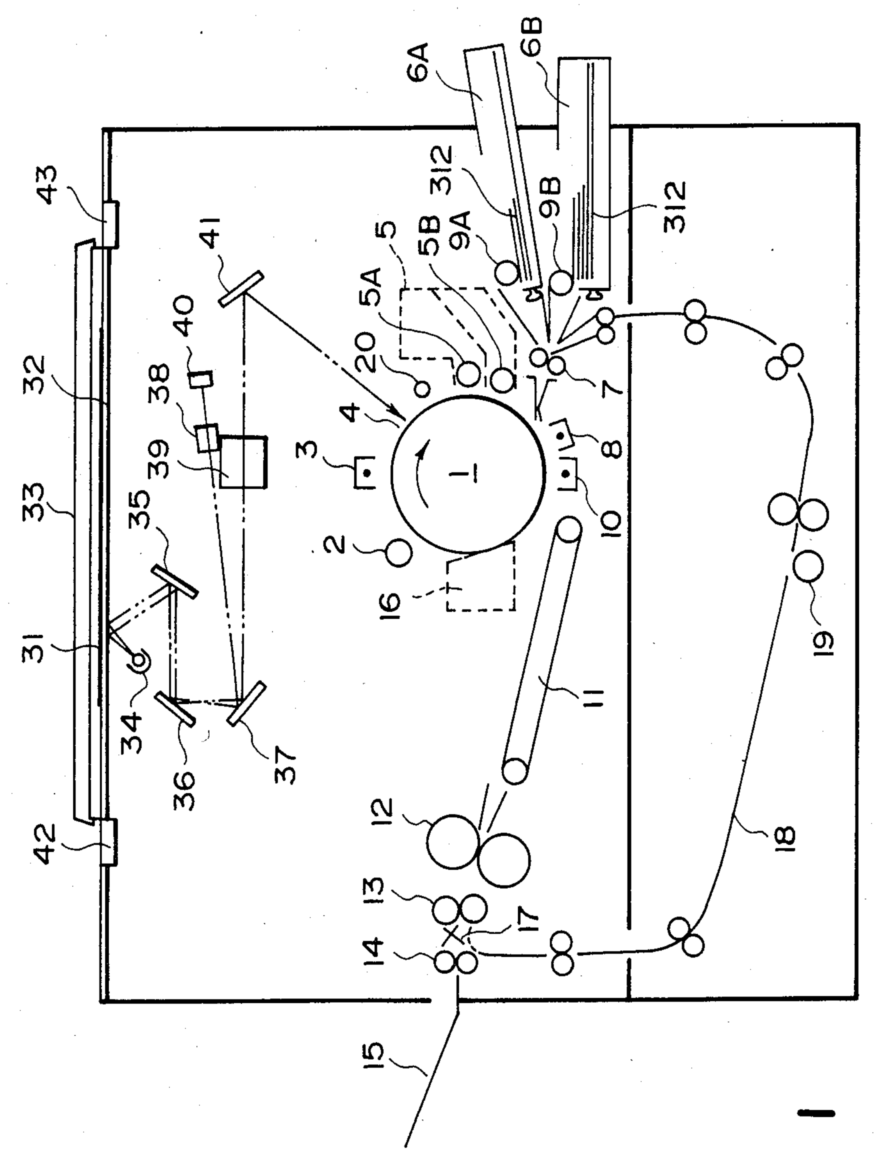
FIG. 1 a diagrammatical view showing an example of an arrangement of a copying apparatus to which the present invention can be applied.

FIG. 1 shows an example of a copying apparatus to which the present invention can be applied. A reference numeral 1 denotes a photo sensitive drum which can be rotated in the direction indicated by an arrow. The surface of this drum is formed from a seamless photo sensitive material consisting of a photo conductive material.

While the photo sensitive drum 1 is rotated once, the photo sensitive material is first discharged by means of a pre-exposure lamp 2 and is subsequently corona charged by a primary charging apparatus 3. When this charged photo sensitive material is rotated to a position indicated at a numeral 4, an image of an original is exposed, so that an electrostatic latent image is formed on the photo sensitive material.

Thereafter, either one of developing rollers 5A and 5B in a developing apparatus 5 is selected in response to an instruction which is output from a control section (not shown) and the latent image is developed as a visual image by means of a toner. Next, a copy paper 312 is conveyed onto the drum 1 at a proper timing from a paper cassette 6A or 6B through a resist roller 7. The toner image is transferred onto the copy paper 312 by means of a transfer charging apparatus 8. Numerals 9A and 9B are paper feed rollers to send out the paper 312 from the cassette 6A and 6B.

After completion of the transfer, the copy paper 312 is separated from the drum 1 by a separation charging apparatus 10 and is led to a fixing roller 12 by a carrying belt 11. The transfer image is thermally fixed by the roller 12 by way of a pressure heating method and thereafter the copy paper 312 is discharged into a tray 15 through a roller 13 and further a paper discharge roller 14.

On the other hand, after the copy transfer paper was peeled off by the separation charging apparatus 10, the toner on the drum 1 is scraped off and cleaned by means of a cleaner such as a brush or the like and is collected into a toner collecting vessel 16. Then, this drum is discharged again by the pre-exposure lamp 2 and the next copy is performed.

A flapper 17 is arranged between the roller 13 and the paper discharge roller 14. In case of an ordinary copy transfer, the flapper 17 is set at the position indicated by a broken line, so that the copy paper 312 is led toward the tray 15. However, in case of a multiple copy transfer, the flapper 17 is set at the position shown by a solid line, so that the paper 312 is once put into a multiple transfer tray 18 and thereafter it is led therefrom to the resist roller 7 by a paper feed roller 19 and is again led to the transfer position on the drum 1, namely, between the drum 1 and the transfer charging apparatus 8. In this way, the copy transfer and fixing processes are repeated. A numeral 20 is a blank exposing apparatus to prevent the unnecessary deposition of the toner on the drum 1. This apparatus has a divided constitution.

An optical reading apparatus of an original image and an illuminating apparatus of the image onto the drum 1 will then be described. An original 31 to be copied is placed on a glass original plate 32. An original pressing plate 33 is put on the upper surface of the original 31 to press and cover the original. The reflection light from the original 31 can be effectively obtained with the aid of the plate 33.

An illumination lamp 34 is constituted integrally with a first scanning mirror 35 and is operated in the scanning direction. A second reflecting mirror 36 is further constituted integrally with a third reflecting mirror 37. The mirrors 36 and 37 are moved at the half speed of the scan moving speed of the mirror 35, thereby allowing the scanning to be performed while the optical path distances to fixed lenses 38 and 39 are always kept constant.

A line sensor 40 is constituted by a CCD memory and the reflection optical image of the original 31 derived through the lens 38 is input to this sensor. The reflection optical image is simultaneously reflected by a fourth reflecting mirror 41 through the lens 39 and is projected onto the latent image forming position 4 on the photo sensitive drum 1.

In addition, upon reading of an image by the CCD sensor 40, a reference white plate 42 is used to correct a variation in light quantity or pixels, while a reference black plate 43 is used to sense the edge of the original 31.

Figure 2:
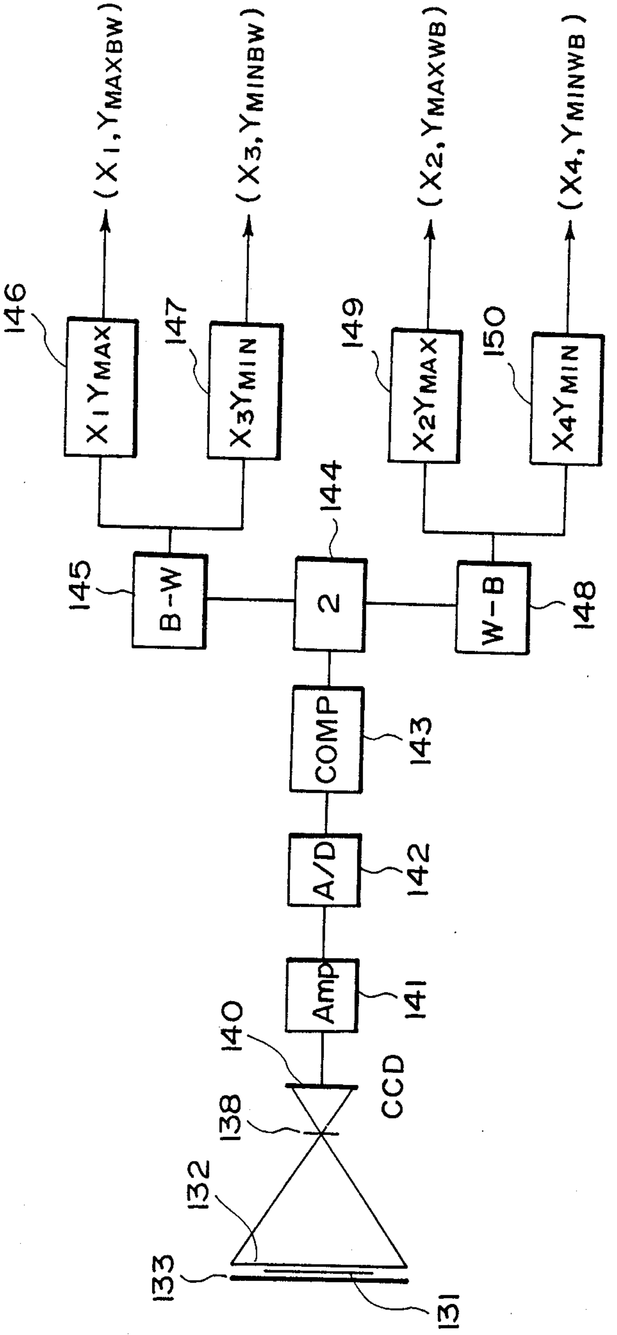
FIG. 2 is an arrangement diagram showing an example of an original coordinates sensing apparatus of the copying apparatus.

FIG. 2 shows an example of an arrangement of an original coordinates sensing apparatus according to the present invention. In this embodiment, the surface on the opposite side of an original plate 132 of an original pressing plate 133 is set to a color of a low reflection factor, for instance, black. A CCD sensor 140 allows a reflection optical image from an original 131 which is supported between the original plate 132 and the pressing plate 133 to be formed as an image through a lens 138 and reads the light and shade of the image. In this embodiment, an output from the CCD sensor 140 is amplified by an amplifier 141 and is further converted to a digital value by an A/D converter 142.

This digital value is compared with a reference value read out from the reference white plate 42 show in FIG. 1 and the variation due to the light quantity or pixels is compensated by a compensating circuit 143. Thereafter, this digital value is binarized by a binarizing circuit 144, so that the binary signal indicative of white or black is derived.

Figure 3:
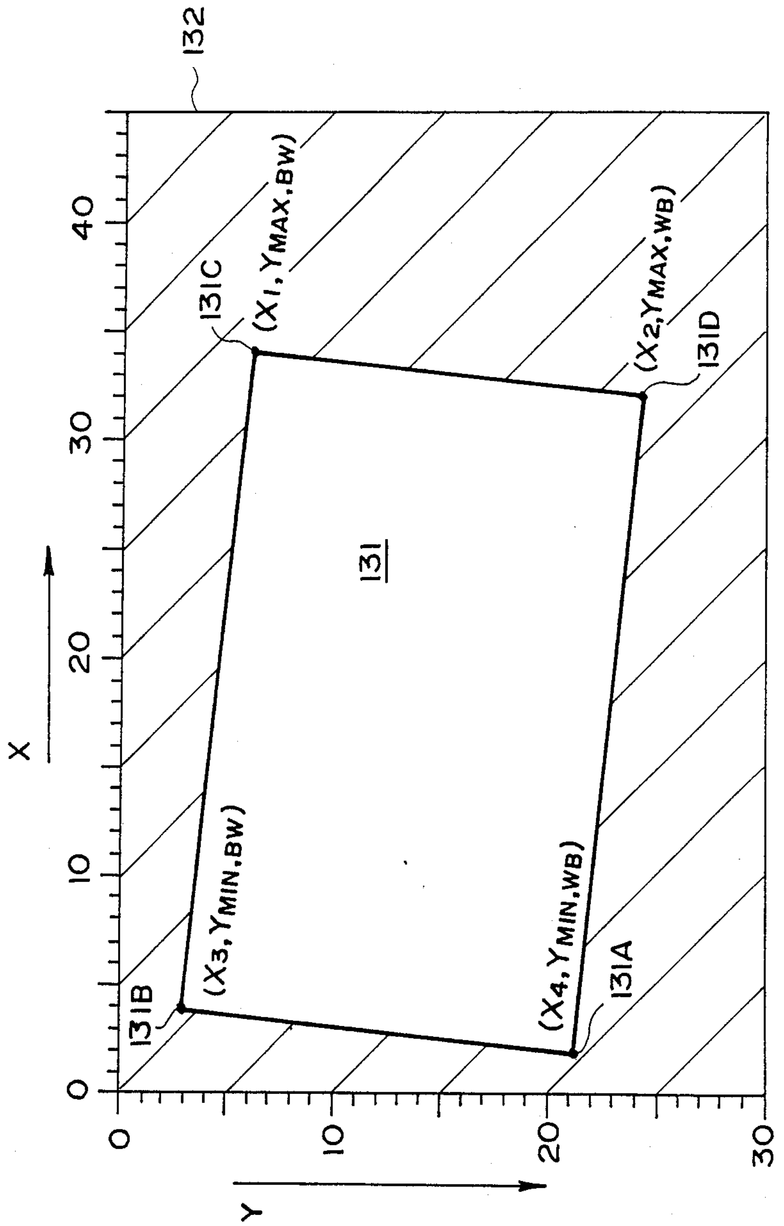
FIG. 3 is an explanatory diagram showing an example of coordinates which are input to the original coordinates sensing apparatus.

When it is now assumed that the original 131 is obliquely put on the original plate 132 as shown in FIG. 3, the reflection optical image is read by the pixels of the CCD sensor 140 along the line in the direction of the Y-axis (main scanning direction) and the optical scanning is performed in the direction of the X-axis (sub scanning direction). Thus, the coordinates of the position where the foregoing binary signal first changes from black to white and the coordinates of the position where the binary signal changes at last from white to black are obtained for every line of the Y-axis due to the binary signal.

Practically speaking, the hatched portion in FIG. 3 corresponds to the area where the density of the reflection light becomes high (black) sinc the surface (not shown) of the original pressing plate 133 which is placed on the upper surface of the original plate 132 is black or the like having a low reflection factor. Therefore, on the basis of the binary signal from the binarizing circuit 144, a B-W sense circuit 145 shown in FIG. 2 senses the Y coordinate of the position where the binary signal first changes from black to white in the Y-axis direction and the X coordinate of that line and then outputs the components of these X and Y coordinates as position detection signals to a B-W maximum value sense circuit 146 and a B-W minimum value sense circuit 147.

Now, the locus of the position where the binary signal changes from black to white in FIG. 3 is traced when the scanning in the X-axis direction was performed. First, the binary signal changes from black to white at one point (hereinafter, referred to as a corner point) 131A of the four corners of the original 131 and thereafter the value of the Y coordinate at the change position decreases and becomes the minimum value $Y_{MIN.BW}$ at a corner point 131B. Next, the Y coordinate increases and becomes the maximum value $Y_{MAX.BW}$ at a corner point 131C. After that, the change point from black to white disappears.

Consequently, the maximum value sense circuit 146 can detect the corner point 131C and can output a detection signal ($X_1$, $Y_{MAX.BW}$) to a CPU (not shown). The minimum value sense circuit 147, on one hand, can detect the corner point 131B and can output a detection signal ($X_3$, $Y_{MIN.BW}$) to the CPU as well.

Similarly, in a W-B sense circuit 148 shown in FIG. 2, the X and Y coordinates of the position where the binary signal changes at last from white to black are detected on the basis of the binary signal from the binarizing circuit 144 and the components of these X and Y coordinates are output as position detection signals to a WB maximum value sense circuit 149 and a W-B minimum value sense circuit 150.

Therefore, the sense circuits 149 and 150 can detect corner points 131D and 131A and can output detection siganls ($X_2$, $Y_{MAX.WB}$) and ($X_4$, $Y_{MIN.WB}$) to the CPU, respectively.

The CPU (not shown) performs various kinds of arithmetic operations as will be explained later on the basis of those position detection signals and can make a control apparatus to derive the optimum copy operative.

A method for arithmetic operation of the deviation amount which is performed for the deviation in position of the original 131 as mentioned above will then be described with reference to FIGS. 4 and 5.

Figure 4:
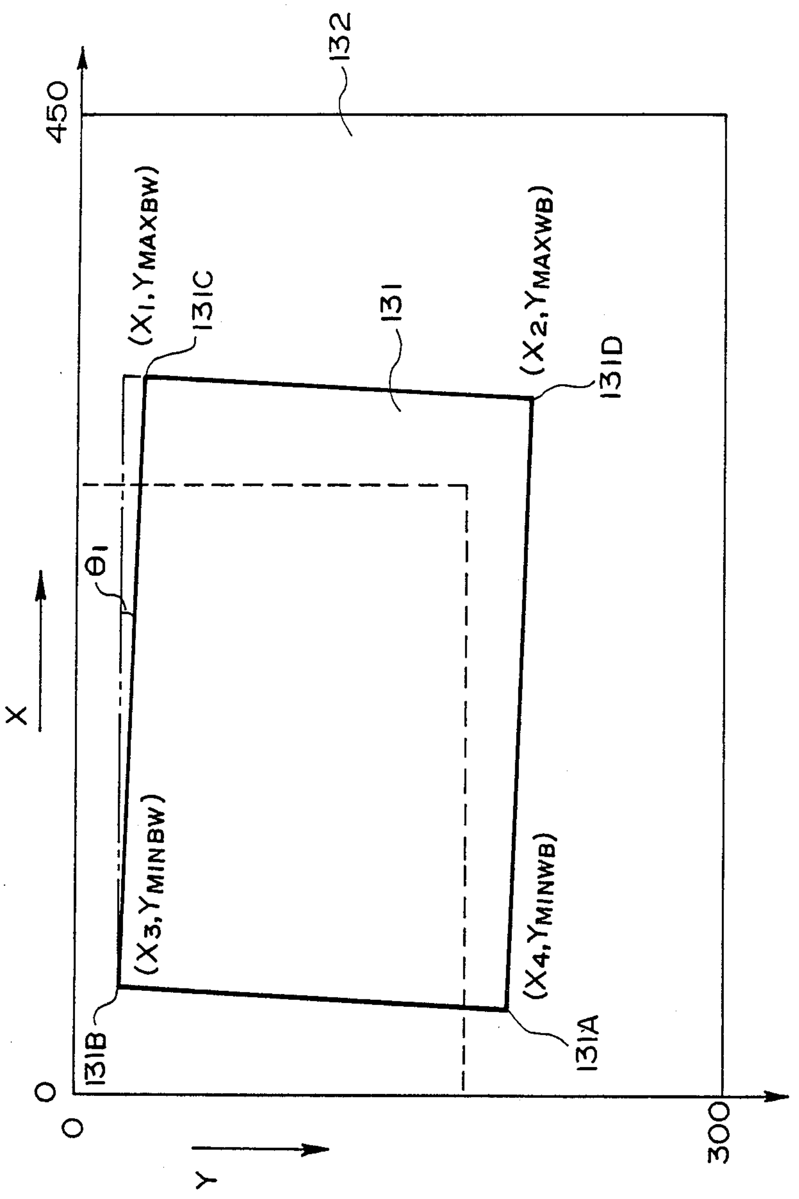
FIGS. 4 and 5 are explanatory diagrams respectively showing an example of coordinates which are input in the case where an original is deviated from the normal position.

FIG. 4 shows the case where the original 131 is placed obliquely in the state similar to FIG. 3, in which the frame indicated by a broken line indicates the normal reference position where the original 131 should be placed.

First, when the coordinates of the positions of $Y_{MAX.BW}$ and $Y_{MIN.BW}$ differ, the controller determines that the original is obliquely set.

A deviation angle $\theta_1$ in this case can be obtained as $$\tan^{-1}\{(Y_{MIN.BW}-Y_{MAX.BW})/(X_1-X_3)\}$$

In the case where the original 131 is deviated clockwise (right-handed rotation) around the corner point 131B as a center as in this example, $$\tan^{-1}\{(Y_{MIN.BW}-Y_{MAX.BW})/(X_1-X_3)\}$$

becomes a negative value, so that the clockwise deviation of the original can be decided due to this.

Figure 5:
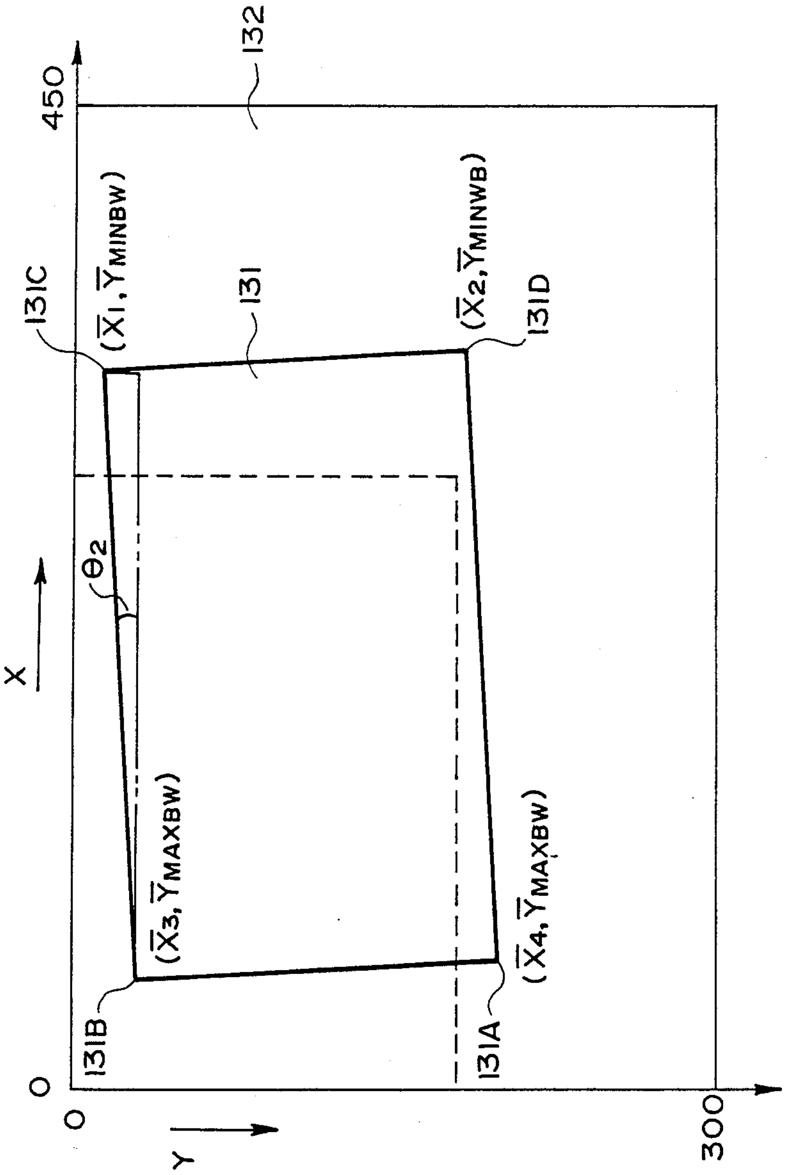

On the other hand, FIG. 5 shows an example of the case where the original 131 is placed at a position that is deviated counterclockwise (left-handed rotation) around the corner point 131B as a center.

A deviation angle $\theta_2$ in this case can be derived as $$\tan^{-1}\{(Y_{MIN.BW}-Y_{MAX.BW})/(X_1-X_3)\}$$

In this case, since the value of $$\tan^{-1}\{(Y_{MIN.BW}-Y_{MAX.BW})/(X_1-X_3)\}$$

becomes positive, it is possible to determine that the original 131 is deviated counterclockwise (left-handed rotation) around the corner point 131B as a center.

To correct the position of the original 131 obliquely placed as mentioned above, the original 131 may be first rotated counterclockwise (left-handed rotation by the angle $\theta_1$ around the corner point 131B as a center in the case of FIG. 4 by means of an original moving apparatus which will be explained later or may be rotated clockwise (right-handed rotation) by the angle $\theta_2$ around the corner point 131B as a center in the case of FIG. 5.

To further move the original 131 to the reference position after the direction of the original was corrected in this way, the original 131 may be moved again in the X-axis direction by only the distance $X_3$ and further in the Y-axis direction by only the distance $Y_{MIN.BW}$ by the original moving apparatus in the case of FIG. 4. In the case of FIG. 5, the original may be likewise moved in the X-axis direction by the distance $X_3$ and further in the Y-axis direction by the distance $Y_{MIN.BW}$.

The size of the original 131 can be also calculated. Namely, in FIG. 4, the longitudinal dimension $X_L$ of the original 131 can be obtained as $(X_1-X_3)/\cos\theta_1$ and the breadth dimension $Y_B$ can be derived as $(Y_{MIN.WB}-Y_{MIN.BW})/\cos\theta_1$. On one hand, in the case of FIG. 5, the $X_L$ can be obtained as $(X_1-X_3)/\cos\theta_2$ and $Y_B$ can be derived as $(Y_{MIN.WB}-Y_{MIN.BW})/\cos\theta_2$ in a similar manner as above.

Figure 6A:
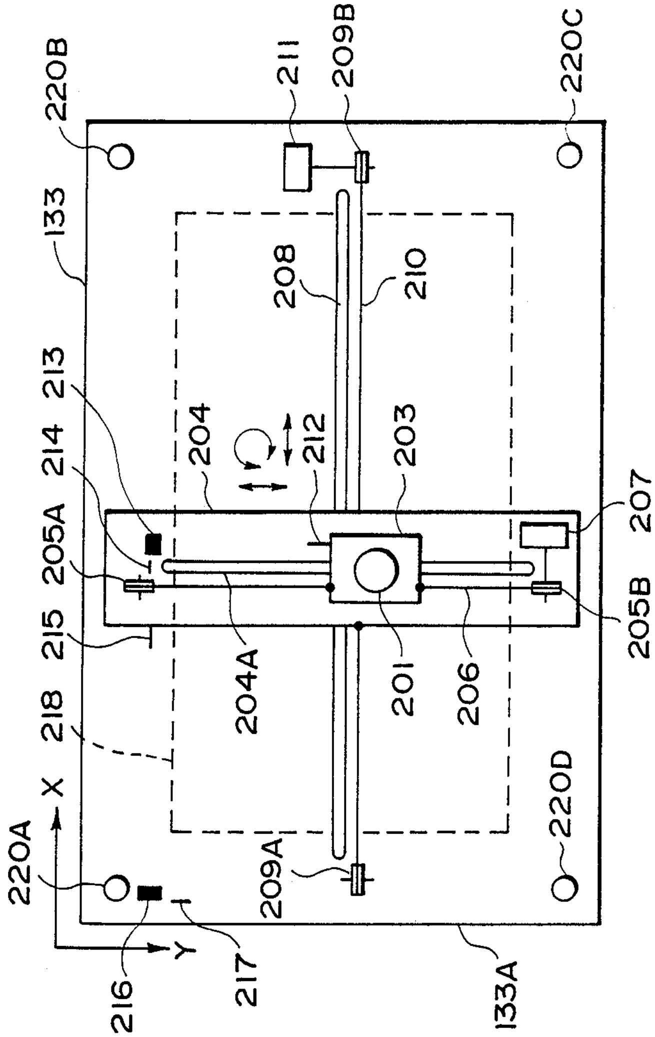
FIGS. 6A and 6B are a top view and a side elevational view respectively showing an example of an arrangement of an original moving apparatus of the copying apparatus.
Figure 6B:
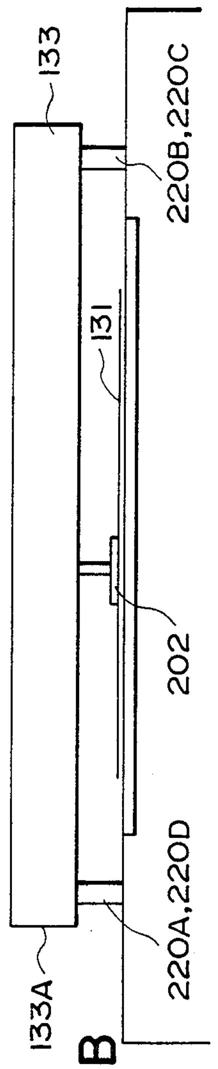

The original moving apparatus will then be described with reference to FIGS. 6A and 6B. FIG. 6 shows the moving mechanism built in the original pressing plate 133, in which a reference numeral 201 denotes a stepping motor to rotate an original moving member 202 shown in FIG. 6B and 203 is a supporting member which supports the stepping moto 201.

The supporting member 203 is movable along a guide groove 204A of a running member 204 adapted to be movable in the Y-axis direction. Both ends of a wire 206 tensioned between pulleys 205A and 205B are coupled to the supporting member 203, thereby enabling the supporting member 203 to be moved in the Y-axis direction by means of a stepping motor 207.

A numeral 208 is a guide groove adapted to allow the running member 204 to be movable in the X-axis direction. Both ends of a wire 210 tensioned between pulleys 209A and 209B are connected to the running member 204, thereby enabling the running member 204 to be moved in the X-axis direction by means of a stepping motor 211.

The supporting member 203 has a magnet 212 and when the magnet 212 comes into contact with a reed switch 213 attached to the running member 204, the switch 213 is closed. Thus, the home position of the X-axis is detected and the supporting member 203 is simultaneously stopped by a stopper 214. In addition, the running member 204 has a magnet 215 and when the magnet 215 comes into contact with a reed switch 216, the switch 216 is closed. Thus, the home position of the Y-axis is detected and the running member 204 is simultaneously stopped by a stopper 217. A numeral 218 shows the home positions in the X-axis and Y-axis directions after positioning.

Numerals 220A to 220D are supporting rods for the original pressing plate 133. In the case where there is no need to correct the position of the original 131, these supporting rods are loaded in the state where they are led into an outer casing 133A forming the original pressing plate 133. However when the movement is required to correct the position of the original 131, the supporting rods 220A to 220D are driven by driving means (not shown) in response to an original pressing plate movement signal from the CPU (not shown) and thereby lifting the outer casing 133A upwardly and keeping the state in that only the original moving member 202 is in contact with the original 131.

Figure 7:
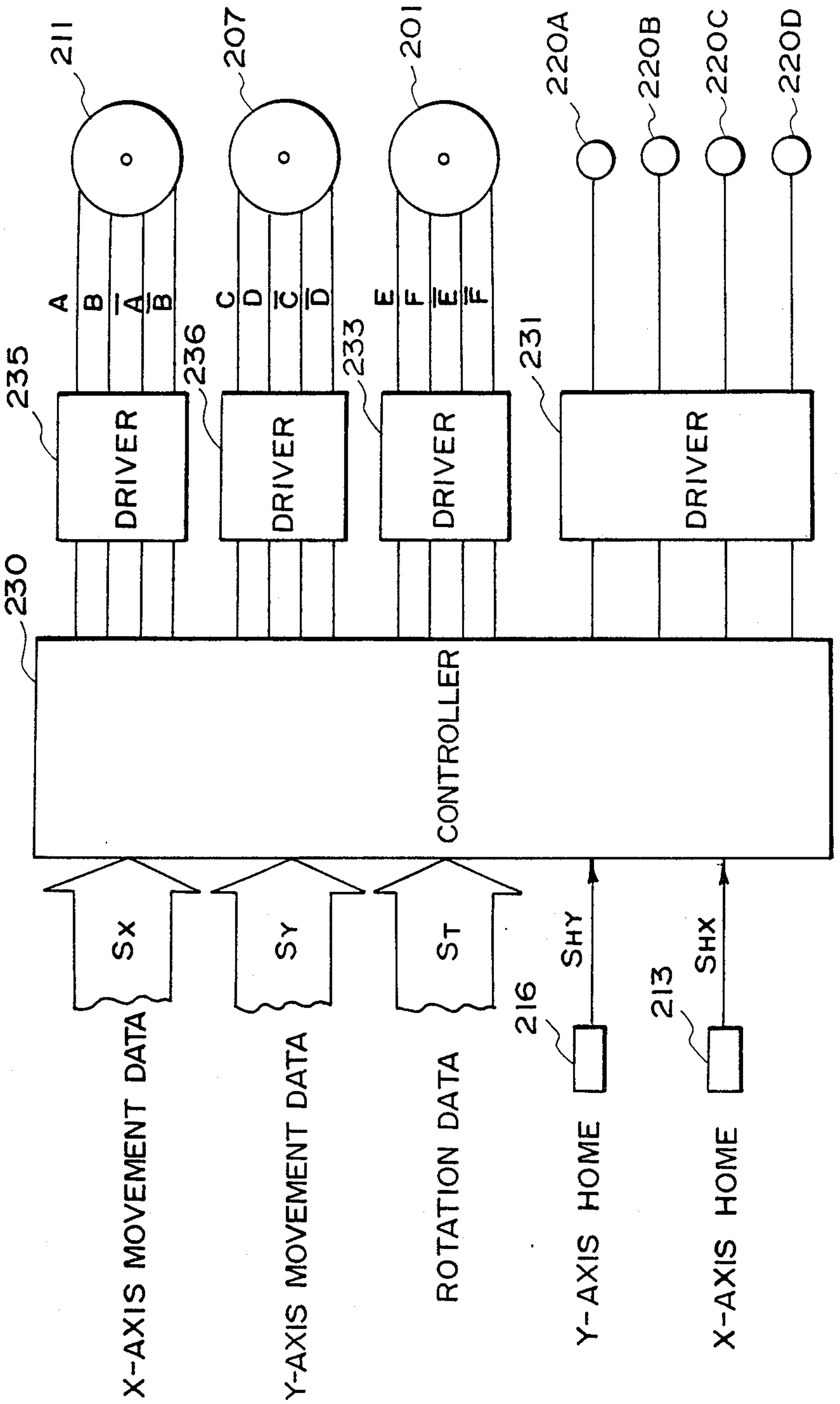
FIG. 7 is an explanatory diagram showing an example of an arrangement of a drive circuit for the original moving apparatus together with its operation.

FIG. 7 shows an arrangement of a drive circuit for the original moving apparatus. A numeral 230 indicates a controller. Following signals are supplied to the controller 230 from the CPU (not shown) and the switches 213 and 216: namely, a signal $S_T$ as rotation data such as the rotation angles $\theta_1$ and $\theta_2$ or the like for correction; a movement data signal $S_X$ to instruct the traveling amount in the X-axis direction; a movement data signal $S_Y$ to instruct the traveling amount in the Y-axis direction; and home position sense signals $S_{HX}$ and $S_{HY}$ in the X-axis and Y-axis directions.

The controller 230 first initializes the original moving apparatus on the basis of the home position sense signals $S_{HX}$ and $S_{HY}$ and drives the supporting rods 220A to 220D through a driver 231, thereby executing the lifting up of the original pressing plate.

Next, if it is necessary to correct the deviation in angle of the original 131, the controller 230 supplies a rotation signal (E, F) or ($\overline{E}$, $\overline{F}$) to the stepping motor 201 through a driver 233 on the basis of the data signal $S_T$ in dependence upon whether the original is rotated clockwise or counterclockwise (i.e., right-handed or left-handed rotation), thereby rotating the motor 201 and correcting the moving member 202 by only the required angle.

Further, if it is necessary to move and correct in both X-axis and Y-axis directions, in the case of the movement in the X-axis direction, the controller supplies a rotation signal (A, B) or ($\overline{A}$, $\overline{B}$) through a driver 235 to the stepping motor 211 on the basis of the data signal $S_X$, thereby forwardly or reversely rotating the motor 211 and moving the running member 204 in the X-axis direction; while in the case of the movement in the Y-axis direction, the controller supplies a rotation signal (C, D) or ($\overline{C}$, $\overline{D}$) through a driver 236 to the stepping motor 207 on the basis of the data signal $S_Y$, thereby forwardly or reversely rotating the motor 207 and moving the supporting member 203 in the Y-axis direction. In this way the original 131 is moved in the X-axis and Y-axis directions.

An apparatus for moving a cassette which can move a copy image in the axial direction of the photo sensitive drum and can transfer the image will then be explained with reference to FIG. 8.

A cassette 306 is movable in the axial direction. of the photo sensitive drum 1 shown in FIG. 1. A cassette supporting plate 306A is attached to the cassette 306. Both ends of a wire 308 tensioned between pulleys 307A and 307B are coupled to the plate 306A and the pulley 307B is driven by a stepping motor 309, thereby making it possible to move the cassette 306 along a guide groove 310.

A paper feed roller 311 serves to send the copy paper 312 from the cassette 306. A rotary roller shaft 313 holds the paper feed roller 311 in the state whereby the roller 311 is movable in the axial direction. One end of a lever 314 is fixed to the cassette supporting plate 306A, while the other end is in light contact with the roller 311. When the cassette 306 is moved along the guide groove 310, the paper feed roller 311 can be also moved in the same direction through the lever 314.

In addition, a shield plate 315 is attached to the cassette supporting plate 306A. A photo interrupter 316 is arranged on the side of a housing 317 of the apparatus. The home position of the cassette 306 is detected at the position where the photo interrupter 316 is optically shielded by the shield plate 315, then this plate is stopped by a stopper 318.

Figure 9:
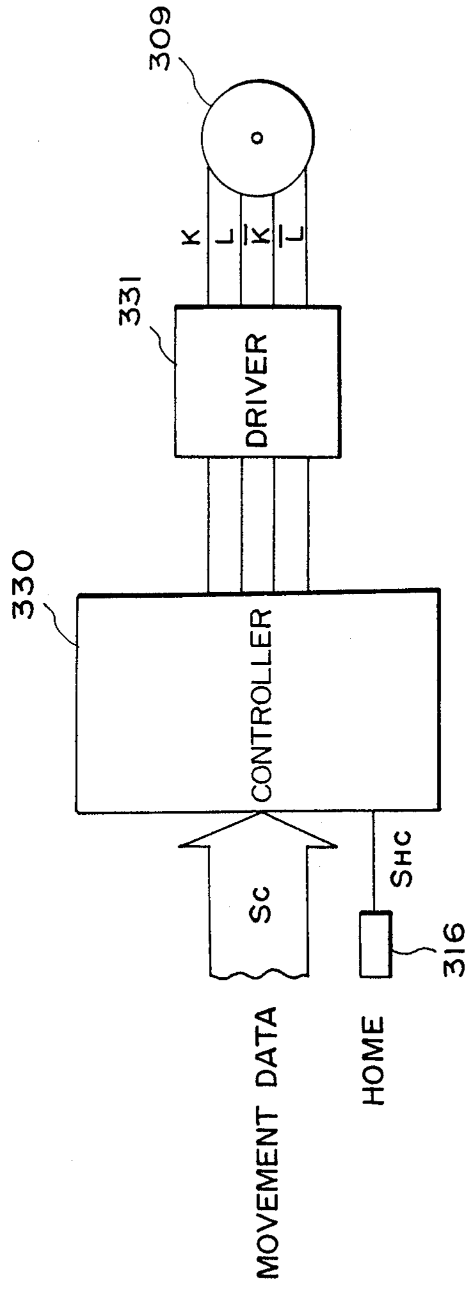
FIG. 9 is an explanatory diagram showing an example of an arrangement of a drive circuit for the cassette moving apparatus together with its operation.

FIG. 9 shows an example of an arrangement of a drive circuit for the cassette moving apparatus, in which a numeral 330 is a controller. A movement data signal $S_C$ regarding the traveling amount of the cassette 306 and a home position sense signal $S_{HC}$ from the photo interrupter 316 are supplied to the controller 330 through an operating section which will be mentioned later.

The controller 330 initializes the position of the cassette 306 on the basis of the sense signal $S_{HC}$ and supplies a rotation signal (K, L) or ($\overline{K}$, $\overline{L}$) to indicate either forward or reverse rotation to the stepping motor 309 through a driver 331 on the basis of the data signal $S_C$. Thus, the cassette 306 can be moved in this way.

A lens moving apparatus will now be described with reference to FIG. 10.

A zoom lens 439 is arranged in the illumination optical path to the drum 1 (refer to FIG. 1). In FIG. 10, the X-axis corresponds to the direction of the illumination optical path and the Y-axis corresponds to the axial direction of the drum 1. The zoom lens 439 is disposed on a lens plate 440 which is movable along a guide groove 441. By connecting both ends of a wire 443 tensioned between pulleys 442A and 442B to the lens plate 440, this lens plate can be moved in the X-axis direction by means of a stepping motor 444.

Further, a lens rotating member 445 can be rectilinearly moved in the Y-axis direction. One end of the rotating member 445 is slidably held to a guide groove 446. When the lens plate 440 is moved in the X-axis direction, the lens 439 is rotated around its optical axis 439A in association with the rectilinear movement of the member 445 in the Y-axis direction, so that the magnification of the lens 439 can be varied.

A numeral 447 is a magnet attached to the lens plate 440 and 448 is a reed switch. When the magnet 447 comes into contact with the reed switch 448, the contact is closed, so that the home position in the X-axis direction is detected and the lens plate 440 is stopped by a stopper 449.

The above-described apparatus are all mounted over a running member 450. Both ends of a wire 452 tensioned between pulleys 451A and 451B are coupled to the running member 450 and the pulley 451B is driven by a stepping motor 453, thereby enabling the member 450 to be moved along a guide groove 451.

A numeral 454 is a magnet attached to the running member 450 and 455 is a reed switch. When the magnet 454 comes into contact with the reed switch 455, its contact is closed, so that the home position in the Y-axis direction is detected and the running member 450 is stopped by a stopper 456.

Figure 11:
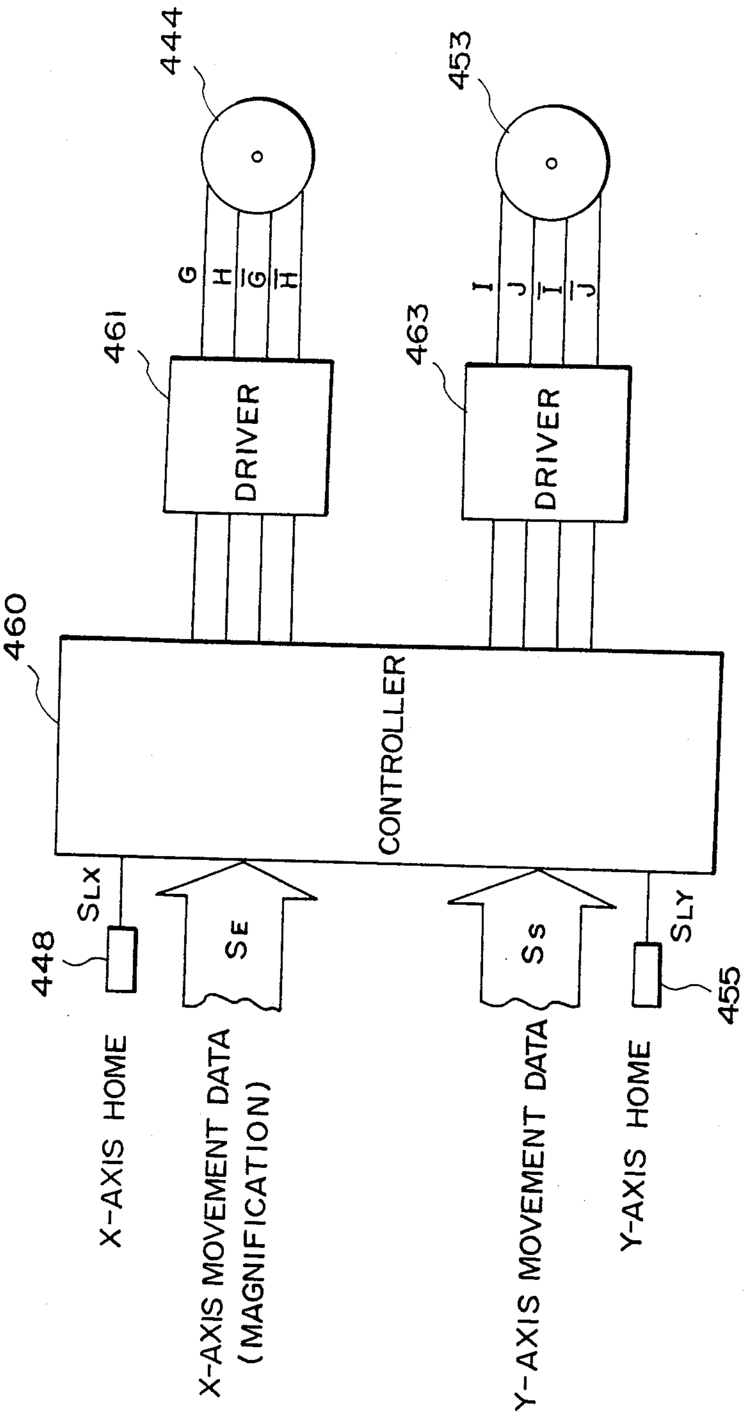
FIG. 11 is an explanatory diagram showing an example of an arrangement of a drive circuit for the lens moving apparatus together with its operation.

FIG. 11 shows an example of an arrangement of a drive circuit of the lens moving apparatus, in which a numeral 460 denotes a controller. The following signals are supplied to the controller 460 through the operating section which will be explained later: namely, an X-axis movement data signal $S_E$ regarding a magnification of an image; a Y-axis movement data signal $S_S$ with respect to the movement in the axial direction of the drum of an image; an X-axis home position sense signal $S_{LX}$ from the reed switch 448; and a Y-axis home position sense signal $S_{LY}$ from the reed switch 455.

The controller 460 initializes the position of the lens on the basis of the sense signals $S_{LX}$ and $S_{LY}$. In the case where the designated data relates to the magnification, for example, the controller 460 supplies a rotation signal (G, H) or ($\overline{G}$, $\overline{H}$) indicative of either the forward or reverse rotation to the stepping motor 444 through a driver 461. The magnification of the copy image can be changed due to the movement in the X-axis direction of the lens 439 and the rotation around the optical axis 439A shown in FIG. 10.

On the other hand, in the case where the designated data is concerned with the movement of an image in the Y-axis direction, the controller 460 supplies either a rotation signal (I, J) or ($\overline{I}$, $\overline{J}$) to the stepping motor 453 through a driver 463, thereby transversely moving the lens 439 in the Y-axis direction, so that the image can be shifted.

As will be obvious from the above description as well, the copy image can be moved in the axial direction of the photo sensitive drum 1 by use of any means of the original moving apparatus, cassette moving apparatus and lens moving apparatus.

Figure 12:
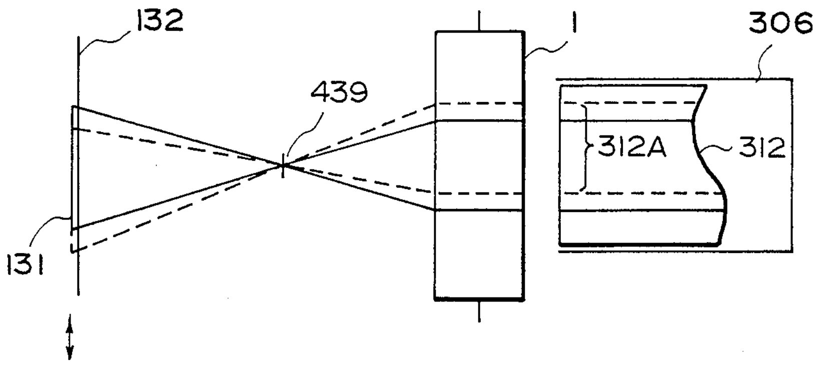
FIGS. 12, 13 and 14 are diagrammatical views illustrating three examples of the procedures to move an image on a copy paper from the image position on an original in the axial direction of a drum by means of the copying apparatus, respectively.

Practically speaking, FIG. 12 shows the case where the image is shifted in the axial direction of the drum 1 by means of the original moving apparatus shown in FIG. 6. In this case, by moving the original 131 to the position indicated by broken lines in the foregoing axial direction, the reflection optical image of the original is formed through the lens 439 to the position indicated by the broken lines on the drum 1, so that a shifted copy image 312A is derived at the position indicated by the broken lines of the copy paper 312.

Figure 8:
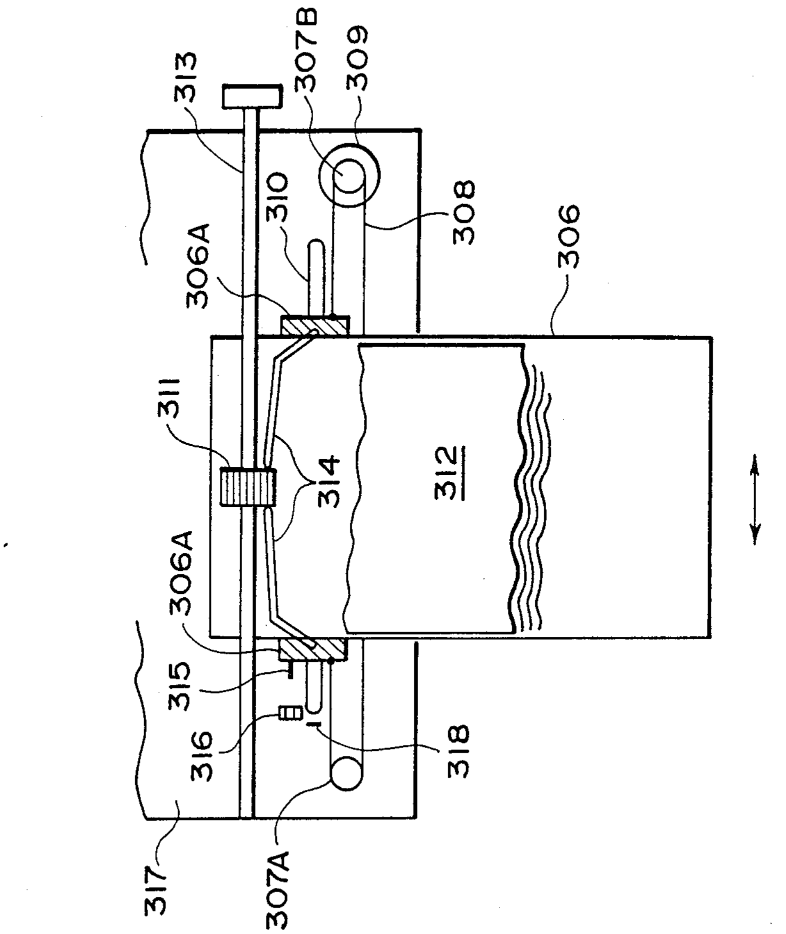
FIG. 8 is a diagrammatical view showing an example of an arrangement of a cassette moving apparatus of the copying apparatus.
Figure 13:
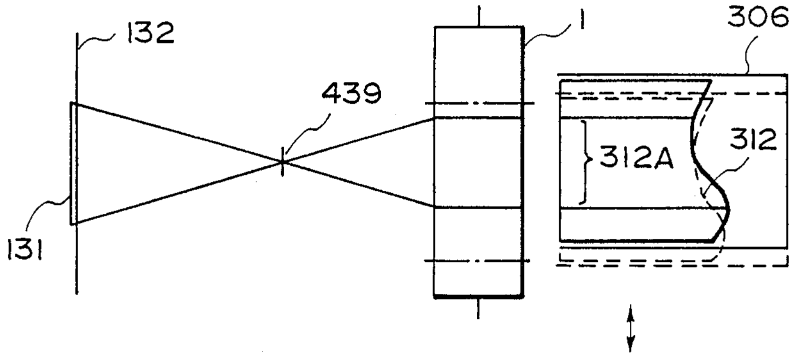

FIG. 13 shows the case where a similar shifting is executed by the cassette moving apparatus shown in FIG. 8. In this case, by moving the cassette 306 to the position indicated by broken lines, the copy paper 312 enclosed in the cassette 306 is sent to the position indicated by alternate long and short dash lines of the drum 1, so that the copy image 312A is derived at the position indicated by solid lines of the copy paper 312.

Figure 10:
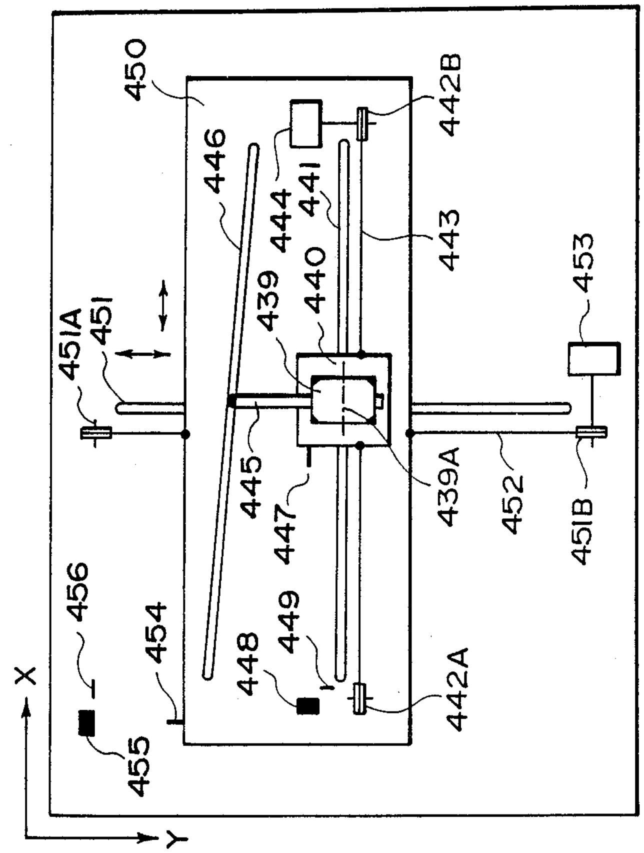
FIG. 10 is a diagrammatical view showing an example of an arrangement of a lens moving apparatus of the copying apparatus.
Figure 14:
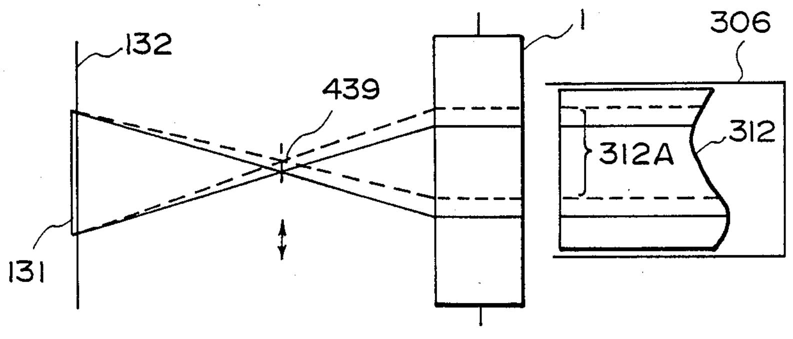

Further, FIG. 14 shows the case where the image shifting is executed by the lens moving apparatus shown in FIG. 10. In this example, there is no need to move the original 131 and cassette 306. Only the lens 439 is moved in the axial direction of the drum 1. Consequently, the copy image 312A can be obtained at the position indicated by broken lines of the copy paper 312.

Figure 15:
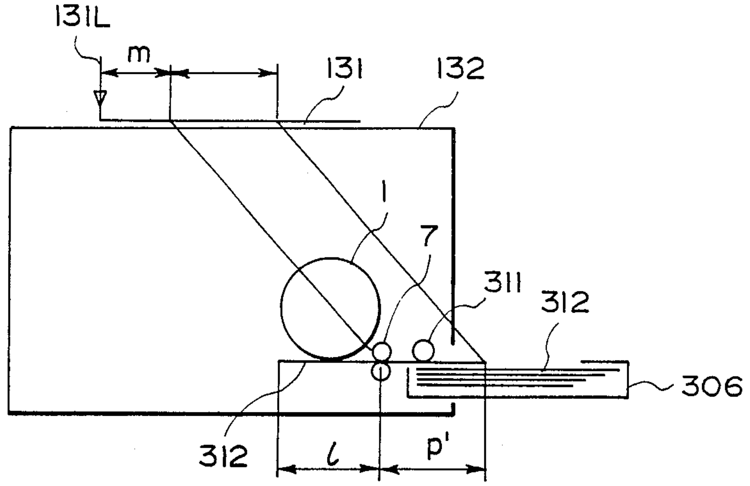
FIGS. 15 and 16 are diagrammatical view illustrating two examples of the procedures to move an image on a copy paper from the image position on an original in the direction perpendicular to the shaft of the drum by means of the copying apparatus, respectively.

Next, as shown in FIG. 15, by controlling only the resist timing for the resist roller 7, the copy image 312A can be also shifted in the scanning direction, namely, in the direction perpendicular to the axis of the drum 1. In the conventional case, the head of the image is made coincident with the edge of the copy paper 312 by driving the resist roller 7 after an expiration of a constant time of the scanning which is started from an image head 131L of the original 131.

In FIG. 15, a reference character m indicates a scan distance within a constant time when the resist roller 7 is driven with a time lag of a constant time. In case of moving the copy image 312A to the edge side of the copy paper 312, the resist roller 7 may be driven at the timing which is later than the foregoing constant time. On the contrary, in case of moving the copy image 312A to the side of the rear edge of the copy paper 312, the resist roller 7 may be driven at the timing which is earlier than the constant time.

For instance, by driving the resist roller 7 at the timing earlier than the constant time to allow the copy paper 312 to go ahead by only a distance l, the image on the original 131 can be moved to a position P' near the rear edge on the copy paper 312.

Figure 16:
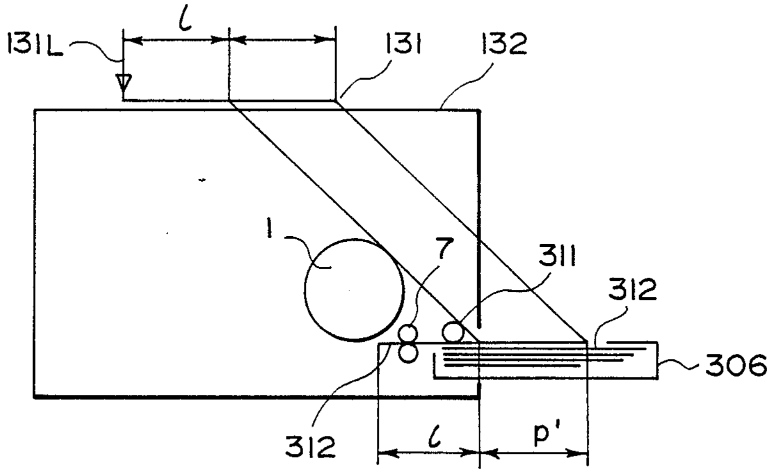

FIG. 16 shows the case where the image is moved in the scanning direction by the original moving apparatus. In this case, for instance, by moving the original 131 to the left in the diagram by only the distance l by means of the original moving apparatus shown in FIG. 6, the image can be shifted to the position P' near the rear edge on the copy paper 312 in a similar manner.

It is also apparently possible to use both of the control of the resist timing and the movement of the original 131 by the original moving apparatus as explained above.

Next, the operating section which can perform the operations for setting the original area and copy area and for designating the magnification or the like in the copying apparatus according to the present invention and the display section for indicating these operations will be explained with reference to FIGS. 17 and 18.

Namely, in the invention, by operating various kinds of keys provided in an operating section 500, the positions and sizes of the original and copy paper and the image area can be displayed in the display section. Simultaneously, by operating a magnification selecting key, a calculating key, or other various kinds of mode keys, the operations in various kinds of modes can be executed.

Figure 17:
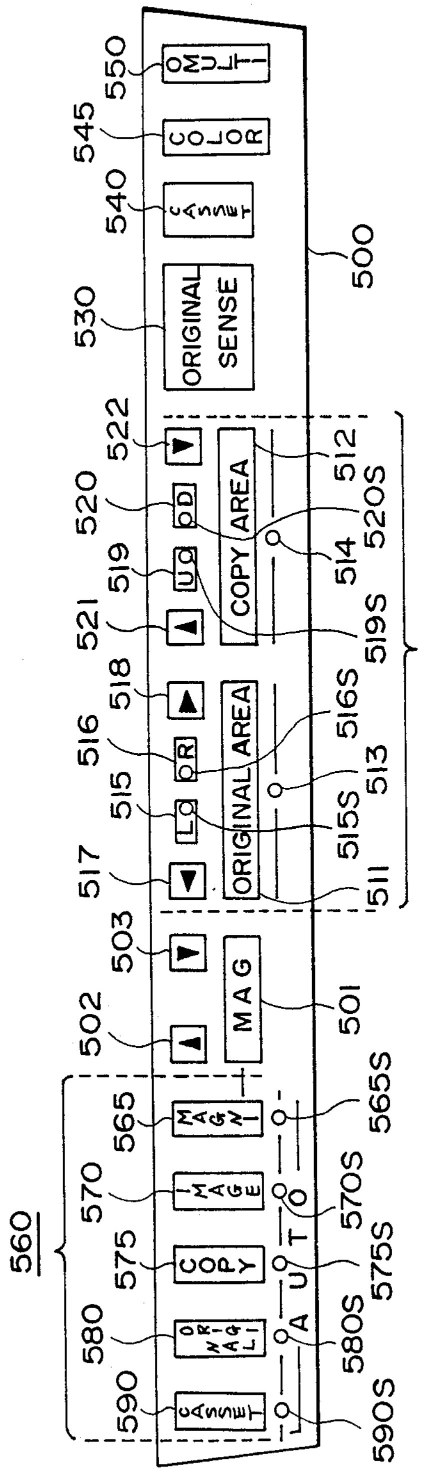
FIG. 17 is a diagrammatical view showing an example of a key arrangement in an operating section of the copying apparatus.
Figure 18:
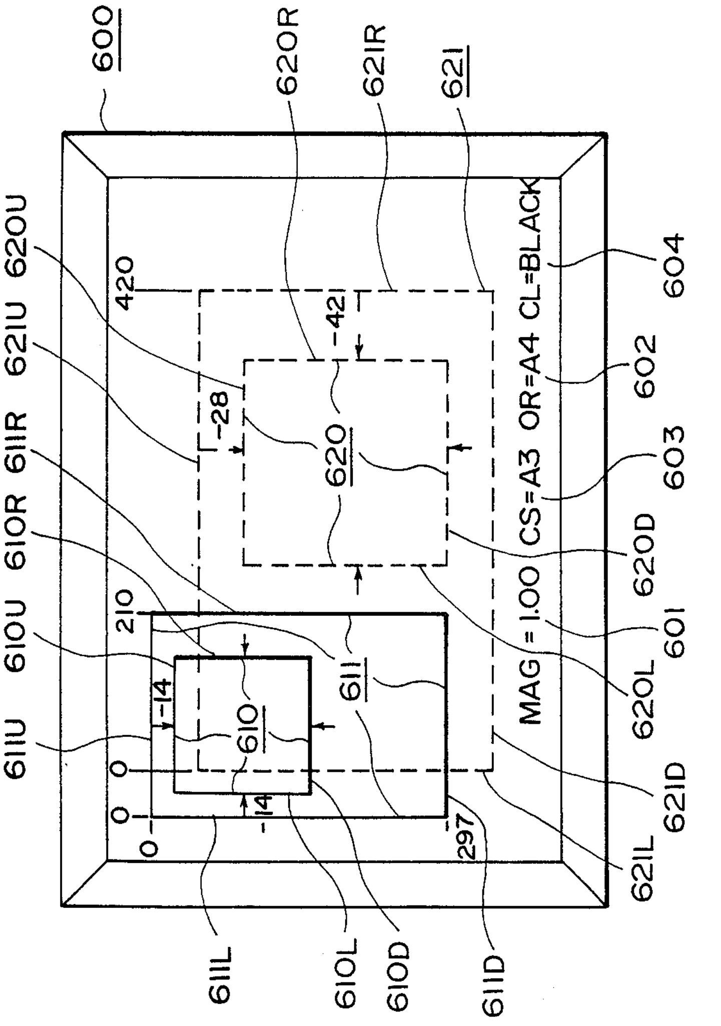
FIG. 18 is an explanatory diagram showing a display section of the copying apparatus and an example of a pattern which is displayed in the display section and its data.

In FIG. 17, a numeral 501 denotes a magnification setting key; 502 is a magnification increasing key; and 503 is a magnification decreasing key. First, a predetermined fixed magnification is designated by pressing the setting key 501 and then the key 502 or 503 is further operated, so that the magnification can be increased or decreased. These magnifications are displayed as numeric values in a magnification display section 601 in a display section 600 shown in FIG. 18.

A numeral 510 represents desired area designating keys; 511 is an original area designating key to designate a desired area of the original; 512 a copy area designating key to designate a desired area on the copy paper; and 513 and 514 light emitting diodes (LEDs) to respectively display that the original area designation and the copy area designation are selected. Further, operating keys 515 to 522 provided over those keys can freely move an original area designation line 610 and a copy area designation line 620 which are displayed in the display section 600 to the right, left, up, and down.

To designate a desired area of the original 131, the original area designating key 511 is first pressed, so that the LED 513 to indicate the designation of the original area is lit on and the LED 514 is kept in the light-off state. Subsequently, by operating necessary ones of the keys 515 to 522, the original line 610 is moved, so that a desired area can be set.

Namely, when the line designating key 515 is pressed, an LED 515S in the display section 600 is lit on to indicate that a frame line 610L on the left side among the frame lines of the original line 610 which are formed like a square shape is moved. Therefore, by pressing the line operating key 517, the frame line 610L can be moved to the left. On one hand, by pressing the line operating key 518, the frame line 610L can be moved to the right. These travelling amounts are displayed as numeric values, for instance, "−14" as shown in FIG. 18 in the display section 600 and simultaneously the frame line 610L is also displayed at the moved position. These traveling amounts can be obtained by counting and converting clocks when the line operating keys 517 and 518 are depressed.

In a similar manner as above, pressing the line designating key 516 allows an LED 516S in the display section 600 to be lit on, thereby indicating that a frame line 610R on the right side of the original line 610 is moved. Therefore, by pressing the line operating keys 517 and 518, the frame line 610R can be moved to the left and right. This movement is displayed in the display section 600 in a similar manner as above.

Moreover, by simultaneously pressing the line designating keys 515 and 516, the frame lines 610L and 610R can be returned to initialization lines 611L and 611R of the original.

Next, the line designating keys 519 and 520 are operated to move an upper frame line 610U and a lower frame line 610D of the original line 610. When the key 519 is pressed, an LED 519S is lit. In this state, by pressing the line operating keys 521 and 522, the frame line 610U can be moved upwardly and downwardly. On one hand, by pressing the line operating keys 521 and 522 in the state whereby an LED 520S is lit due to the depression of the line designating key 520, the frame line 610D can be moved upwardly and downwardly.

These travelling amounts and the positions of the frame lines 610U and 610D moved are displayed in the display section 600. On the other hand, by simultaneously pressing the keys 519 and 520, the frame lines 610U and 610D can be initialized to the positions of initialization lines 611U and 611D.

The case of designating the original area has been described in the above. In case of designating the copy area, by pressing the copy area designating key 512, this designation is indicated by the light-on of the LED 514, while the LED 513 is maintained in the light-off state.

To move a frame line 620L on the left side of the frame line 620 of the square copy line displayed in the display section 600, the depression of the line designating key 515 and the shifting operations to the left and right by means of the line operating keys 515 and 516 may be performed in a similar manner as in the case of the designation of the original area mentioned above. In case of a frame line 620R on the right side, the key 516 is pressed and a similar operation may be performed.

On the other hand, to move the upper frame line 620U and lower frame line 620D of the frame line 620, the line designating keys 519 and 520 are depressed and the subsequent line operating keys 521 and 522 are operated. In addition, by simultaneously pressing the line designating keys 515 and 516, the frame lines 620L and 620R can be initialized to the positions of initialization copy lines 621L and 621R. Further, by simultaneously pressing the line designating keys 519 and 520, the frame lines 620U and 620D can be initialized to the positions of initialization copy lines 621U and 621D.

A numeral 530 denotes an original sense key to sense the size of original. Pressing the key 530 allows the scanning apparatus of the optical system, namely, the apparatus constituted by the light source lamp 34, mirrors 35, 36 and 37, and lens 38 in the example shown in FIG. 1 to pre-scan. Then, the position of the original 131 is detected by the CCD line sensor 40 and is converted to the size in the display section 600 and the position of the original can be displayed by this display section.

In the case where there is deviations in position and direction of the original 131, the original 131 can be returned to the normal position by the original moving apparatus through the controller 230 shown in FIG. 7. In such a case, the original size can be displayed in the display section 600 using an initialization line 611 and by calculating the length from the coordinates detected, the dimensions regarding the length and width can be also displayed by numeric values. In this way, the size of the original is further displayed as, for example, "OR=A4" in an original size display section 602 in the display section 600.

A numeral 540 is a cassette display key. By pressing the key 540, the size of the copy paper 312 enclosed in the cassette 306 which was selected and designated is displayed in the display section 600 as a copy area initialization line 621. At the same time, the length of the copy paper is displayed on a millimeter unit basis and the classification of the size is also displayed in a cassette size display section 603.

A numeral 545 is a switching key of the developing apparatus 5 (refer to FIG. 1). A switching between the developing rollers 5A and 5B can be performed by the key 545. The switched color is displayed in a color display section 604 in the display section 600. A discrimination of the color of the developing apparatus is performed by means of a microswitch (not shown) provided in the developing apparatus.

A numeral 550 is a multiple mode key. The multiple copy can be designated by this key. Pressing the key 550 allows the switching flapper 17 shown in FIG. 1 to be switched to the position indicated by the solid line, so that the copy paper 312 is sent into the intermediate tray 18 and thereby enabling the next multiple copy to be executed. In case of the multiple designated number of (second) copies, the flapper 17 is returned to the position indicated by the broken line.

A numeral 560 denotes a group of keys for the automatic selection mode.

Practically speaking, a numeral 565 is an automatic magnification calculating key and by pressing this key, the magnification of the copy area on the copy paper 312 to the image area on the original 131 is calculated, so that the magnification is displayed.

Namely, by pressing the key 565, the magnification calculating mode is indicated by means of the light-on of an LED 565S and the light-off of other LEDs on the same line corresponding to the keys 560. In this case, the size of the original 131 is automatically detected due to the pre-scanning of the CCD sensor and further the size of the designated copy paper 312, namely, the size of the cassette 306 (refer to FIG. 8) is displayed in the display section 600.

It is now assumed that a desired image area on the original 131 and a desired copy area on the copy paper 312 were designated due to the operations of various desired ones of the foregoing area designating keys by the operator. When the key 565 is depressed in such a situation, the magnification of the copy area to the image area is automatically calculated and it is displayed in the magnification display section 601.

In this case, the ratio between X and Y (namely, X:Y) of the area which was previously designated between the image area and the copy area has been stored in the CPU (not shown). With respect to the area which is designated later, the line 610 or line 620 is moved while keeping the relation of the ratio of X:Y of the area stored previously.

A numeral 570 denotes an automatic copy area selecting key. By pressing this key, the automatic copy area selection mode is indicated due to the light-on of an LED 570S and the light-off of other LEDs on the same line corresponding to the keys 560. In this case, the size of the original 131 is automatically detected due to the pre-scanning and at the same time the size of the copy paper designated, namely, the size of the cassette is further displayed in the display section 600.

It is now assumed that the operator designated a desired image area on the original 131 and a desired magnification by operating the magnification designating key 501 and magnification increasing and decreasing keys 502 and 503. When the foregoing area selecting mode key 570 is pressed in such a situation, the area to be copied on the copy paper 312 is automatically calculated and is displayed as the copy line 620.

In this case also, by further pressing the copy area designating key 512 and operating the keys 515 to 522, the copy area can be obviously moved to the left, right, up, and down while keeping the shape of the copy line 620 (size of the copy area).

A numeral 575 is an automatic image area selecting key. By pressing this key, the automatic image area selection mode is indicated due to the light-on of an LED 575S and the light-off of other LEDs on the same line corresponding to the keys 560. In this case as well, the size of the original 131 is automatically detected due to the pre-scanning and simultaneously the size of the copy paper 312 designated is further displayed in the display section 600.

It is now assumed that a desired copy area on the copy paper 312 and a desired magnification were designated by the operator. When the image area selecting key 575 is pressed in such a situation, the image area on the original 131 is automatically calculated and is displayed as the image line 610 in the display section 600.

In this case, by further pressing the original area designating key 511 and operating the keys 515 to 522, the copy area can be moved to the left, right, up, and down while keeping the shape of the image line 610.

A numeral 580 is an original size selecting key. By pressing this key, the original size selection mode is indicated due to the light-on of an LED 580S and the light-off of other LEDs on the same line corresponding to the keys 560. In this case, only the size of the copy paper 312 designated is displayed in the display section 600.

It is now assumed that a desired copy area on the copy paper 312 and a desired magnification were designated by the operator. When the original size selecting key 580 is pressed in such a situation, the size of the corresponding original 131 is calculated and is displayed as the original initialization line 611.

Due to the above-described operations of the keys in the operating section 500, the image area on the original 131 and the copy area on the copy paper 312 can be automatically or manually set. The copy of the image in the image area set in this way into the copy area can be realized by use of a series of means of the foregoing original moving apparatus, lens moving apparatus, cassette moving apparatus, etc.

Moreover, if the switching key 545 of the developing apparatus is operated to designate the copy color or if the multiple mode key 550 is operated to once store the copy paper 312 into the intermediate tray 18 and the next designation is performed, the image can be edited and further the colored image can be copied in the designated color whenever the copy is executed.

A numeral 590 is an automatic cassette selecting key. By pressing this key, the automatic cassette selection mode is indicated due to the light-on of an LED 590S and the light-off of other LEDs on the same line corresponding to the keys 560. In this case, only the original size detected automatically due to the pre-scanning is displayed in the display section 600.

It is now assumed that a desired image area on the original 131 and a desired magnification were designated by the operator. When the automatic cassette selecting key 590 is pressed in such a situation, the optimum size of the copy paper 312 that satisfies these conditions is automatically calculated and the size of the cassette in which the copy paper 312 of this size has been enclosed is displayed in the cassette size display section 603. Simultaneously, the cassette of this size is automatically selected.

On the contrary, if the cassette of that size does not exist, only the copy line 621 corresponding to the calculated size is displayed and an LED 590S is simultaneously allowed to flicker.

The case where the original size is detected by a combination of the scanning apparatus of the optical system and the CCD line sensor 40 has been described in the above. However, in this case, the pre-scanning before the copy is needed as mentioned above. Therefore, in addition to the CCD sensor 40 and scanning apparatus of the optical system, an area sensor (not shown) for two-dimensionally sense an original may be also used. With such an arrangement, the position and size of the original 131 can be sensed in association with the depression of the original sense key 530 without pre-scanning. Consequently, it is obviously possible to correct the position of the original by driving the original moving apparatus while monitoring the positional deviation displayed in the display section 600.

The foregoing operations will then be explained again with reference to flowcharts shown in FIGS. 19 to 23.

Figure 19:
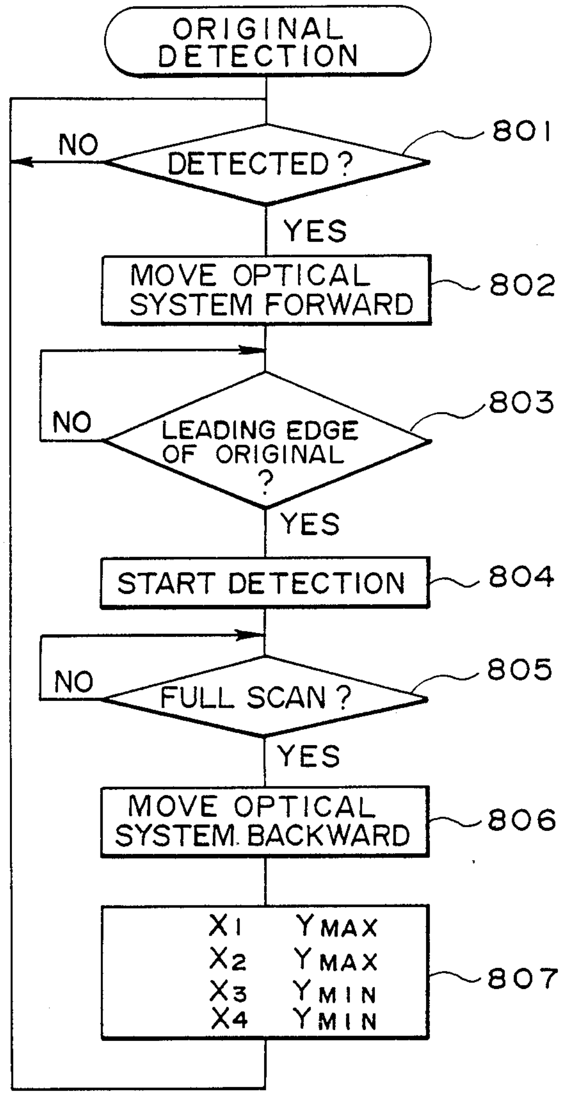
FIG. 19 is a flowchart showing the operation for sensing an original.

FIG. 19 is a flowchart to explain the operation for sensing the original. In step 801, a check is made to see if the original detection (pre-scanning) is performed or not. In case of executing the detection, the optical system is moved forward (step 802). Then, a check is made to see if the leading edge of the signal indicative of the edge of the original comes or not (step 803). In response to this leading edge, the original detection by the CCD sensor is started (step 804). After completion of the full scanning of the optical system, the original detection by the CCD sensor is finished and the optical system is moved backward (steps 805 and 806). The coordinates of the four corners of the original are determined (step 807).

Figure 20:
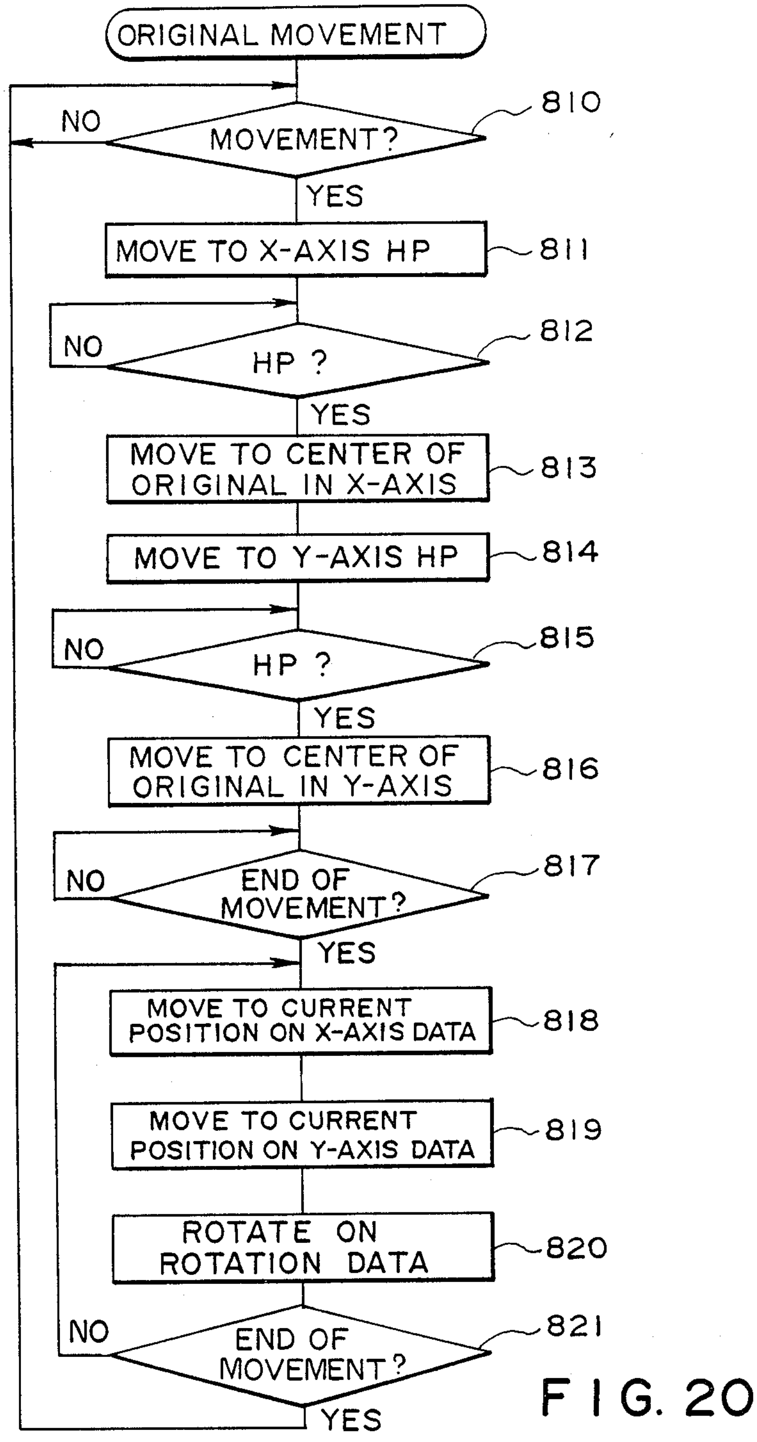
FIG. 20 is a flowchart showing the operation for moving an original.

FIG. 20 is a flowchart to explain the operation of the original moving apparatus. In step 810, a check is made to see if the original is moved or not to correct the position of the original or to copy the image in an arbitrary image area into an arbitrary copy area. In case of moving the original, the original moving member 202 is moved to the home position in the X-axis direction (step 811). A check is made to see if the home position is detected or not (step 812). When it is detected, the moving member 202 is moved to the center of the original in the X-axis direction (step 813). Similarly, with respect to the Y-axis direction as well, in step 814 to 816, the moving member is moved to the center of the original. A check is made to see if the initialization movement is finished or not in step 817. When it is finished, the original is moved to a desired position in the X-axis direction in step 818. Then, the original is moved to a desired position in the Y-axis direction in step 819. Thereafter, the original is rotated in accordance with the rotation data calculated in step 820 and a check is made to see if the movement is finished or not in step 821.

Figure 21:
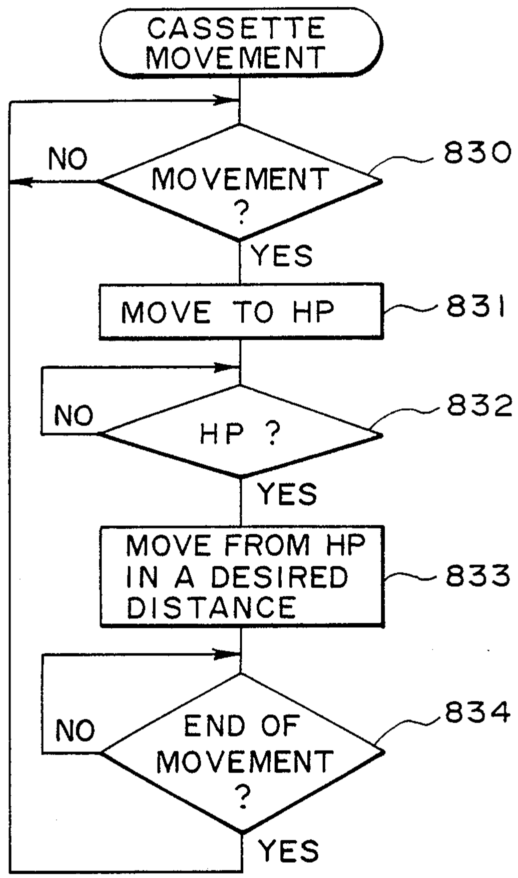
FIG. 21 is a flowchart showing the operation for moving a cassette.

FIG. 21 is a flowchart to explain the operation of the cassette moving apparatus. A check is made to see if the cassette is moved or not in step 830. In case of moving the cassette, it is moved to the home position in step 831. A check is made to see if the home position is detected or not in step 832. If it is detected, the cassette is moved by a distance corresponding to the amount of shifting of the image in step 833. A check is made to see if the movement is finished or not in step 834.

Figure 22:
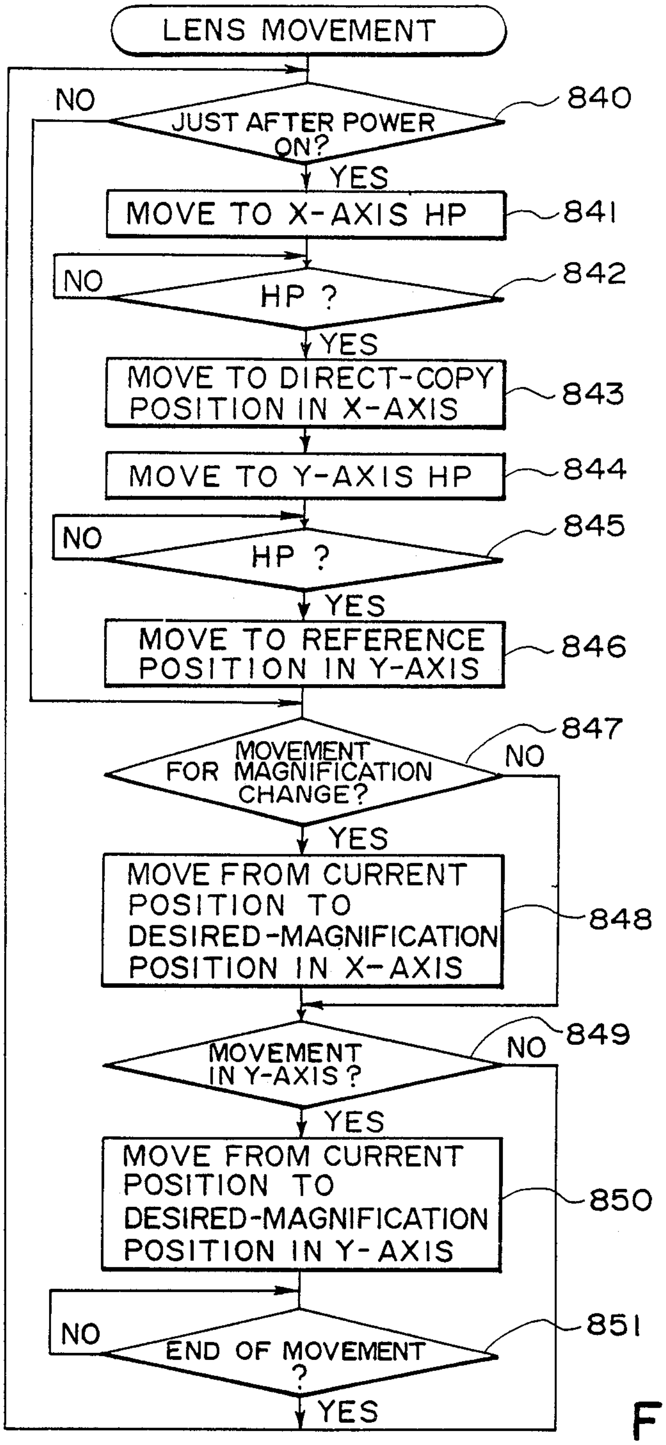
FIG. 22 is a flowchart showing the operation for moving a lens.

FIG. 22 is a flowchart to explain the operation for moving the lens. A check is made to see if the main power supply has been just turned on at present or not in step 840. If it is just after the power-on, the lens is initialized. Practically speaking, the lens is moved in the direction of the X-axis home position in step 841. A check is made to see if the home position is detected or not in step 842. If it is detected, the lens is moved to the direct-copy position where the equal magnification copy is performed in step 843. Further in step 844, the lens is moved in the direction of the home position of the Y-axis. A check is made to see if the Y-axis home position is detected or not in step 845. If it is detected, the lens is moved to the ordinary reference position in the Y-axis direction in step 846 and then the initialization upon power-on is finished. A check is made to see if the lens movement is for magnification change or not in step 847. In case of the movement for the magnification change, the lens is moved from the current position to the desired position corresponding to the magnification input in step 848. A check is then made to see if the lens movement in the Y-axis direction is for the image shift or not in step 849. In case of the movement in the Y-axis direction, the lens is moved from the current position to the desired magnification position corresponding to the image shift amount in the Y-axis direction in step 850. Then, a check is made to see if the movement is finished or not in step 851.

Figure 23:
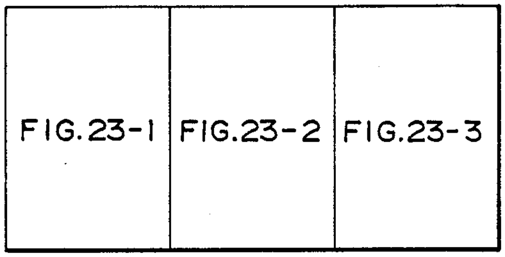
FIG. 23 composed of FIGS. and 23-1, 23-2 and 23-3 is a flowchart showing the operation of the whole apparatus.
Figures 1, 23:
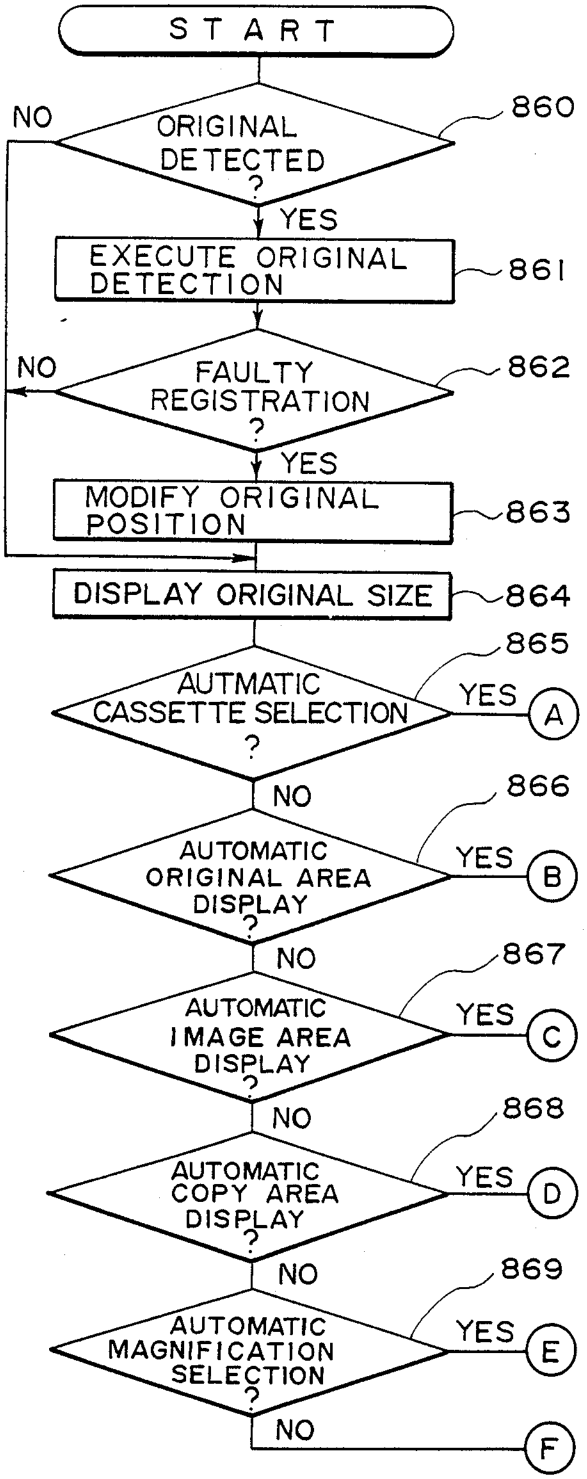
Figures 2, 23:
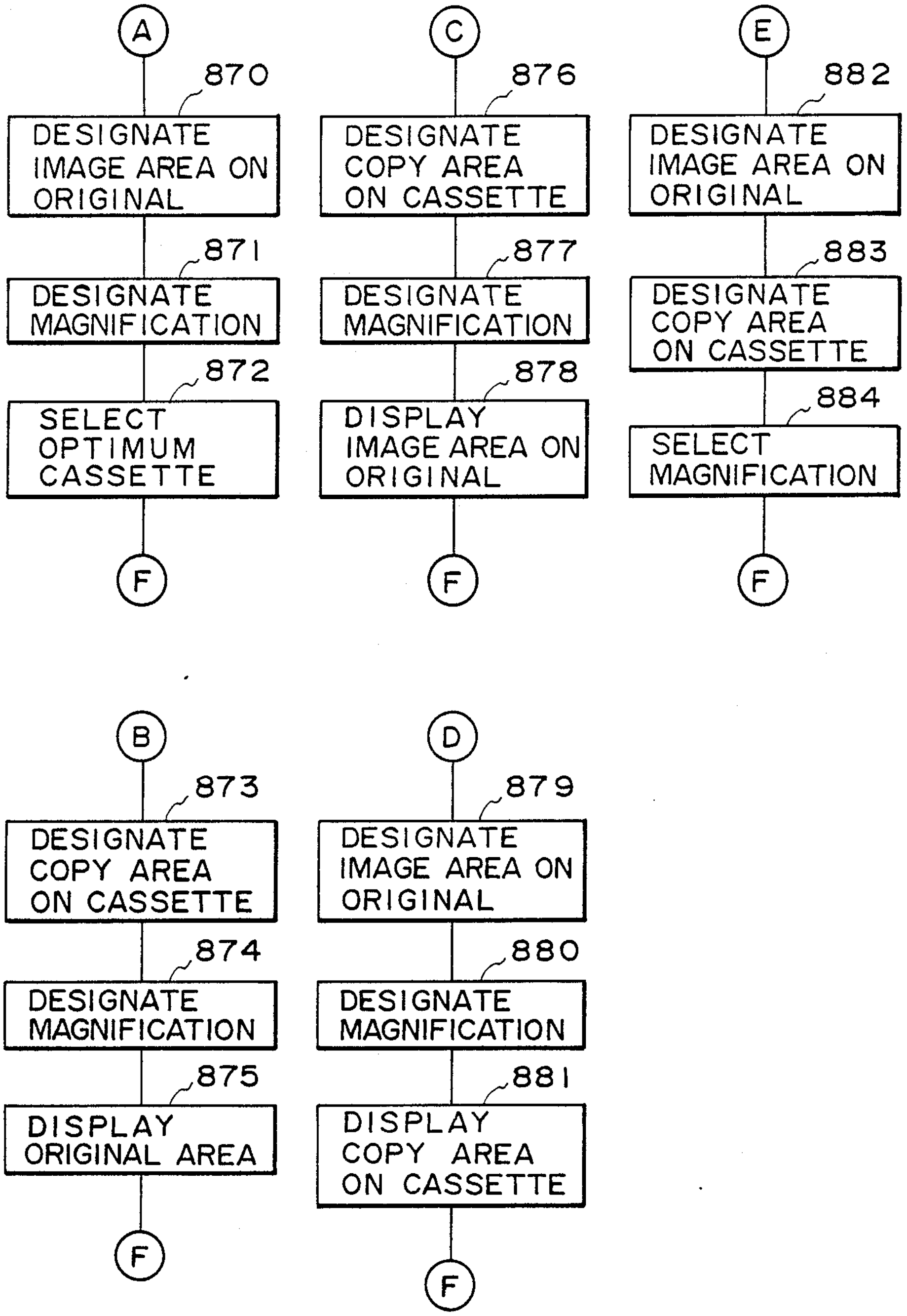
Figures 3, 23:
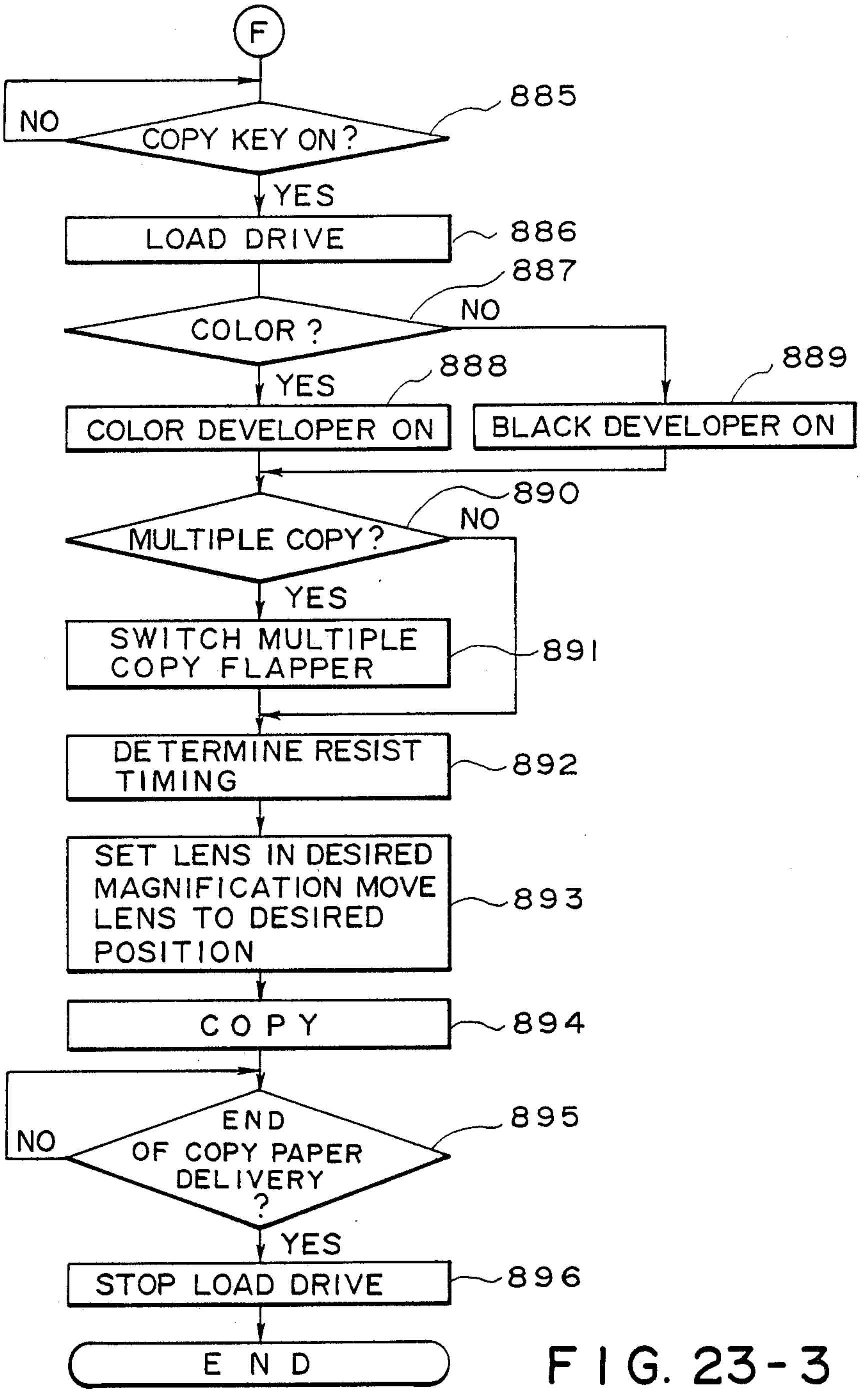

FIG. 23 is a flowchart showing the operation of the whole apparatus. A check is made to see if the original detection is performed or not in step 860. This detection is performed when either one of the original sense key 530, automatic magnification calculating key 565, automatic copy area selecting key 570, automatic image area selecting key 575, and automatic cassette selecting key 590 is pressed. The foregoing origina coordinates are detected in step 861. A check is made to see if there is a deviation in position or not in step 862. The original position is modified by the original moving apparatus in step 863. The size of the detected original is displayed in step 864.

A check is made to see if either one of the above-mentioned automatic keys is pressed or not in steps 865 to 869. Then, as described above, the automatization is carried out in correspondence to various designations. These procedures are shown in (A) to (E).

In step 885, a check is made to see if the copy key is pressed or not. In case of performing the copy, a load such as a main motor, a high voltage or the like is driven in step 886. A check is then made to see if the color copy is performed or not in step 887. In case of performing the color copy, the color developing apparatus is driven in step 888. For the black copy, the black developing apparatus is driven in step 889. A check is made to see if the multiple copy is performed or not in step 890. When the multiple copy is executed, the multiple copy flapper 17 is driven in step 891, thereby allowing the copy paper to be enclosed into the intermediate tray. The resist timing is determined in step 892 to shift the image by a desired amount. In step 893, the lens is moved to the position corresponding to a desired magnification and a desired shift amount. The copy is executed in step 894 in accordance with the set conditions. A check is made to see if the paper discharge is finished or not in step 895. The driving of the load is stopped in step 896 and then the copy operation is finished.

As described above, prior to copying, the dimensions and positions of the image area and copy area can be selected and the magnifications can be set by the operating section 500 and further the execution for the calculations or the like regarding them can be input by the operating section 500. Moreover, the size and position of the original 131 and the size of the cassette and the like are all sequentially displayed in the display section 600. Therefore, in association with the depression of a copy key (not shown) to start the copy, the position and size of the original 131 can be detected and the position and size can be also displayed in the display section 600. In the case where the original 131 is set at an improper position, the start of copying is stopped for a constant time duration irrespective of the depression of the copy key and a warning is issued to the operator, thereby enabling the operator to make a judgment about the correction.

If the original moving apparatus is not driven or the original pressing plate 133 is not manually opened within the constant time, it is regarded that the operator admits the improper position of the original. Thus, the copying operation is automatically started or the copying operation can be also started only when the copy key is again pressed.

Furthermore, by use of an internal eraser which is constituted by, e.g., an LED array or the like in the copying apparatus of the present invention, format sentences, a page, a date, etc. can be added, or the image which has been read by the CCD may be temporarily displayed on a CRT display and image area can be designated on the CRT display. For instance, such as an LED printer, it is apparent that the image read by the CCD can be written by means of the internal eraser or the like.

In addition, the apparatus can be also constituted in such a manner that various kinds of areas are preset to the dimensions which have been preliminarily designated and a desired area is selected from among these preset areas.

As described above, according to the present invention, there are provided: image area designating means; image area display means for displaying the area designated by the area designating means; copy area designating means; and copy area display means for displaying the area designated by the copy area designating means. Therefore, the magnification can be calculated from both of the image and copy areas displayed in those area display means and the copy can be executed.

Moreover, according to the invention, in addition to the above-mentioned means, there are further provided: original coordinates sense means; original moving means; lens moving means; cassette moving means; cassette selecting means; and resist roller timing control means. The position and size of the original are detected by the original coordinates sense means. The size of the copy paper, namely, the size of the cassette is selected through the cassette selecting means due to the designation of the magnification. And, at least one of the original moving means, lens moving means, cassette moving means, and resist roller timing controlling means is driven. Thus, the image area can be copied in the copy area with the magnification calculated as described above.

In case of designating the color, the color to be used may be automatically and sequentially changed for every copying operation and the colored image can be also copied.

Also, the copying apparatus can be allowed to be interlocked with a general automatic original feeding apparatus and the color editing can be automatically performed in accordance with a predetermined mode.

On one hand, the present invention also can be applied to an apparatus which processes image information as an electrical signal.

What is claimed is:

1. A copying apparatus comprising:

optical means for projecting an image of an original onto a copy material;

image forming means for forming the original image projected by said optical means on the copy material;

image area designating means for designating an arbitrary area on the original;

copy area designating means for designating an arbitrary area on the copy material; and control means for copying an image in said image area into said copy area, wherein said control means includes means for erasing the image formed on the copy material in response to the area designation by said image area designating means.

2. A copying apparatus which optically exposes an original and copies it on a copy material comprising:

image area designating means for designating an arbitrary area on the original;

copy area designating means for designating an arbitrary area on the copy material; and copying means for copying an image in said image area into said copying area wherein said copying means has at least one or a plurality of means among, original moving means for moving the original on an original plate, lens moving means for moving a lens provided on an optical path in an arbitrary direction, cassette moving means for moving a cassette in which the copy material is enclosed, and resist control means for controlling a resist timing, and wherein the image in said image area is copied into said copy area due to said at least one of or a combination of a plurality of said means.

3. A copying apparatus which optically exposes an original and copies it on a copy material comprising:

image area designating means for designating an arbitrary area on the original;

copy area designating means for designating an arbitrary area on the copy material; and calculating means for calculating a copy magnification from said image area and said copy area.

4. A copying apparatus according to claim 3, wherein an image in said image area is copied into said copy area on the basis of said magnification calculated.

5. A copying apparatus comprising:

copy area designating means for designating an arbitrary area on a copy material;

magnification setting means for setting a copy magnification;

calculating means for calculating a size of an image area on the original which can be copied from said copy area and said copy magnification; and display means for displaying said image area calculated.

6. A copying apparatus according to claim 5, wherein said image area can be moved to an arbitrary position.

7. A copying apparatus which optically exposes an original and copies it on a copy material comprising:

image area designating means for designating an arbitrary area on the original;

magnification setting means for setting a copy magnification;

calculating means for calculating a size of a copy area on said copy material from said image area and said copy magnification; and display means for displaying said copy area.

8. A copying apparatus according to claim 7, wherein said copy area can be moved to an arbitrary position

9. A copying apparatus comprising:

copy area designating means for designating an arbitrary area on a copy material;

magnification setting means for setting a copy magnification;

calculating means for calculating a size of the original which can be copied from said copy area and said copy magnification; and display means for displaying said original size.

10. A copying apparatus which optically exposes an original and copies it on a copy material comprising:

image area designating means for designating an arbitrary area on the original;

magnification setting means for setting a copy magnification;

calculating means for calculating a size of the copy material on which the copy can be performed from said image area and said copy magnification; and display means for displaying said copy material size.

11. A copying apparatus according to claim 10, further having selecting means for selecting the copy material of said calculated size.

12. An image forming apparatus comprising:

image area designating means for designating an arbitrary area on an original;

color designating means for outputting a signal to designate a color of an image in said image area;

image formation area designating means for designating an arbitrary area on an image forming material; and image forming means for forming the image in said image area into said image formation area on the basis of the signal from said color designating means.

13. An image forming apparatus comprising:

image area designating means for designating an arbitrary area on an original, said image area designating means comprising coordinate input means for inputting data;

color designating means for outputting a signal to designate a color of an image in said image area; and image forming means for forming the image in said image area on the basis of the signal from said color designating means;

wherein the arbitrary area designated by said image area designating means is a two-dimensionallly closed area.

14. An image forming apparatus comprising:

color designating means for designating a color for image information;

image formation area designating means for designating an arbitrary area on an image forming material; and image forming means for forming the image of said image information into said image formation area on the basis of said designated color.

15. An image forming apparatus according to claim 14, wherein said image forming means exposes an original and forms an image according to the original on the image forming material.

16. An image forming apparatus according to claim 14, wherein the arbitrary area designated by said image formation area designating means on the image forming material is a two-dimensionally closed area.

17. An copying apparatus comprising:

image area designating means for designating an arbitrary area on an original;

means for designating a color for an image of the area designated by said image area designating means;

means for copying the image of the area designated by said image area designating means on a sheet;

first control means for causing said copying means to copy on a sheet an image of the area of a first original designated by said image area designating means in a first color designated by said color designating means; and second control means for causing said copying means to copy an image of the area of a second original designated by said image area designating means in one of the first color and a second color designated by said color designating means on the sheet on which an image was copied in said first color.

18. A copying apparatus according to claim 17, which further has copy area designating means for designating an arbitrary area on a copy sheet, and in which said first control means causes said copying means to copy the image of the area of the first original into said arbitrary copy area.

19. A copying apparatus according to claim 18, further comprising means for displaying the area designated by said copy area designating means.

20. A copying apparatus according to claim 17, which further has copy area designating means for designating an arbitrary area on a copy sheet, and in which said second control means causes said copying means to copy the image of the area of the second original into said arbitrary copy area.

21. A copying apparatus according to claim 20, further comprising means for displaying the area designated by said copy area designating means.

22. A copying apparatus according to claim 17, further comprising means for displaying the area designated by said copy area designating means.

23. An copying apparatus comprising:

copy means for exposure-scanning an original and copying an image of the original on an sheet;

means for designating a color for the image of the original;

copy area designating means for designating an arbitrary area on a copy material;

first control means for causing said copy means to copy the image of a first original into the area designated by said copy area designating means in a first color designated by said color designating means; and second control means for causing said copy means to copy the image of a second original into the area designated by said copy area designating means on the sheet copied in said first color, in one of said first color and a second color designated by said color designating means.

24. A copying apparatus according to claim 23, further comprising means for displaying the area designated by said copy area designating means.

25. A copying apparatus according to claim 17, further comprising means for temporarily containing a sheet copied by said first control means, wherein said second control means executes a multi-color operation on the sheet in said container means.

26. A copying apparatus according to claim 23, further comprising means for temporarily containing a sheet copied by said first control means, wherein said second control means executes a multi-color operation on the sheet in said container means.

27. A copying apparatus according to claim 1, wherein said image area designating means comprises key input means.

28. A copying apparatus according to claim 1, wherein said copy area designating means comprises key input means.

29. A copying apparatus according to claim 1, wherein said image area designating means and said copy area designating means comprise common key input means.

30. A copying apparatus according to claim 29, further comprising display means for selecting one of said image area designating means and said copy area designating means to be represented by operation of said common key and for indicating said selection.

31. A copying apparatus according to claim 27, further comprising display means for displaying a datum, to be input, among a plurality of data which constitute said image area designated by said image area designating means.

32. A copying apparatus according to claim 28, further comprising display means for displaying a datum, to be input, among a plurality of data which constitute said copy area designated by said copy area designating means.

33. A copying apparatus according to claim 1, wherein said erasing means comprises a light-emitting element.

34. A copying apparatus according to claim 3, wherein said image area designating means comprises key input means.

35. A copying apparatus according to claim 3, wherein said copy area designating means comprises key input means.

36. A copying apparatus according to claim 3, wherein said image area designating means and said copy area designating means comprises common key input means.

37. A copying apparatus according to claim 36, further comprising display means for selecting one of said image area designating means and said copy area designating means to be represented by operation of said common key and for indicating said selection.

38. A copying apparatus according to claim 34, further comprising display means for displaying a datum, to be input, among a plurality of data which constitute said image area designated by said image area designating means.

39. A copying apparatus according to claim 35, further comprising display means for displaying a datum, to be input, among a plurality of data which constitute said copy area designated by said copy area designating means.

40. A copying apparatus according to claim 3, further comprising displaying means for displaying said copy magnification calculated by said calculating means.

41. A copying apparatus according to claim 5, wherein said copy area designating means comprises key input means.

42. A copying apparatus according to claim 41, further comprising display means for displaying a data, to be input, among a plurality of data which constitute said copy area designated by said copy area designating means.

43. A copying apparatus according to claim 6, further comprising display means for displaying the amount of movement of said image area.

44. A copying apparatus according to claim 6, further comprising display means for displaying a movement direction of said image area.

45. A copying apparatus according to claim 6, further comprising key input means for designating a movement direction of said image area, wherein said image area is moved upon pressing said key input means.

46. A copying apparatus according to claim 5, wherein said display means graphically displays said image area.

47. A copying apparatus according to claim 7, wherein said image area designating means comprises key input means.

48. A copying apparatus according to claim 47, further comprising display means for displaying a datum, to be input, among a plurality of data which constitute said image area designated by said image area designating means.

49. A copying apparatus according to claim 8, further comprising display means for displaying the amount of movement of said copy area.

50. A copying apparatus according to claim 8, further comprising display means for displaying the amount of movement of said copy area.

51. A copying apparatus according to claim 8, further comprising key input means for designating a movement direction of said copy area, wherein said copy area is moved upon pressing said key input means.

52. A copying apparatus according to claim 7, wherein said display means graphically displays said copy area.

53. A copying apparatus according to claim 9, wherein said copy area designating means comprises key input means.

54. A copying apparatus according to claim 53, further comprising display means for displaying a datum, to be input, among a plurality of data which constitute said copy area designated by said copy area designating means.

55. A copying apparatus according to claim 9, wherein said display means graphically displays said original size.

56. A copying apparatus according to claim 10, wherein said image area designating means comprises key input means.

57. A copying apparatus according to claim 56, further comprising display means for displaying a datum, to be input, among a plurality of data which constitute said image area designated by said image area designating means.

58. A copying apparatus according to claim 10, wherein said display means displays said copy material size with letter.

59. A copying apparatus according to claim 10, wherein said display means graphically displays said copy material size.

60. A copying apparatus according to claim 59, further comprising detecting means for detecting said size of the copy material mounted in said apparatus, wherein when said copy material corresponding to said size calculated by said calculating means is not mounted, said display means displays said calculated size.

61. An image forming apparatus according to claim 12, wherein said image area designating means comprises key input means.

62. An image forming apparatus according to claim 12, wherein said image formation area designating means comprises key input means.

63. An image forming apparatus according to claim 12, wherein said image formation area designating means and said copy area designating means comprise common key input means.

64. An image forming apparatus according to claim 63, further comprising display means for selecting one of said image area designating means and said image formation area designating means to be represented by operation of said common key and for indicating said selection.

65. An image forming apparatus according to claim 61, further comprising display means for displaying a datum, to be input, among a plurality of data which constitute said image area designated by said image area designating means.

66. An image forming apparatus according to claim 62, further comprising display means for displaying a datum, to be input, among a plurality of data which constitute said image formation area designated by said image formation area designating means.

67. An image forming apparatus according to claim 12, further comprising display means for displaying said color designated by said color designating means.

68. An image forming apparatus according to claim 12, said image forming means comprises a plurality of developing means, wherein one of the plurality of developing means is selected in response to the designation of said color designating means.

69. An image forming apparatus according to claim 13, further comprising display means for displaying a datum, to be input, among a plurality of data which constitute said image area designated by said image area designating means.

70. An image forming apparatus according to claim 13, further comprising display means for displaying said color designated by said color designating means.

71. An image forming apparatus according to claim 13, said image forming means comprises a plurality of developing means, wherein one of the plurality of developing means is selected in response to the designation of said color designating means.

72. An image forming apparatus according to claim 14, said image formation area designating means comprises key input means.

73. An image forming apparatus according to claim 72, further comprising display means for displaying a datum, to be input, among a plurality of data which constitute said image formation area designated by said image formation area designating means.

74. An image forming apparatus according to claim 14, further comprising display means for displaying said color designated by said color designating means.

75. An image forming apparatus according to claim 14, said image forming means comprises a plurality of developing means, wherein one of the plurality of developing means is selected in response to the designation of said color designating means.

76. An image copying apparatus according to claim 17, wherein said image formation area designating means comprises key input means.

77. An image copying apparatus according to claim 76, further comprising display means for displaying a datum, to be input, among a plurality of data which constitute said image area designated by said image area designating means.

78. An image copying apparatus according to claim 17, further comprising display means for displaying said color designated by said color designating means.

79. An copying apparatus according to claim 18 or 20, wherein said copy area designating means comprises key input means.

80. An image forming apparatus according to claim 79, wherein said image area designating means and said copy area designating means comprise common key input means.

81. A copying apparatus according to claim 80, further comprising display means for selecting one of said image area designating means and said copy area designating means to be represented by operation of said common key and indicating said selection.

82. A copying apparatus according to claim 79, further comprising display means for displaying a datum, to be input, among a plurality of data which constitute said copy area designated by said copy area designating means.

83. A copying apparatus according to claim 19 or 20, wherein said display means graphically displays said copy area.

84. A copying apparatus according to claim 22, wherein said display means graphically displays said image area.

85. A copying apparatus according to claim 19 or 21, wherein said image area and said copy area are graphically displayed on the same display means.

86. A copying apparatus according to claim 23, wherein said copy area designating means comprises key input means.

87. A copying apparatus according to claim 86, further comprising display means for displaying a datum, to be input, among a plurality of data which constitute said copy area designated by said copy area designating means.

88. A copying apparatus according to claim 23, further comprising display means for displaying said color designated by said color designating means.

89. A copying apparatus according to claim 24, wherein said display means graphically displays said copy area.

90. A copying apparatus comprising:

storing means for storing a recording medium;

detecting means for detecting the size of said recording medium;

display means for numerically displaying said size of said recording medium, in a predetermined length-unit, as detected by said detecting means; and means for forming an image on said recording medium.

91. A copying apparatus according to claim 90, wherein said display means displays a name of said size of said recording medium.

92. A copying apparatus according to claim 90, wherein said displays means graphically displays said size of said recording medium.

93. An original reading apparatus comprising:

output means for outputting a signal in response to a reflecting light from an original;

detecting means for detecting the size of said original in response to said signal; and display means for numerically displaying said size of said original, in a predetermined length-unit, as detected by said detecting means.

94. An original reading apparatus according to claim 93, wherein said display means displays a name of said size of said original.

95. An original reading apparatus according to claim 93, wherein said display means graphically displays said size of said original.

96. An original reading apparatus according to claim 93, wherein said output means comprises light-emitting elements in array.

97. An image forming apparatus according to claim 13, wherein said coordinate input means comprises key input means.

98. An original reading apparatus according to claim 93, further comprising:

exposure-scanning means for exposure-scanning said original, wherein said output means outputs a density signal corresponding to said reflecting light obtained from said original by an exposure-scanning operation of said exposure-scanning means.

* * * * *

UNITED STATES PATENT AND TRADEMARK OFFICE

CERTIFICATE OF CORRECTION

PATENT NO. : 4,745,443

DATED : May 17, 1988

INVENTOR(S) : HIDEKI ADACHI, ET AL.

It is certified that error appears in the above-identified patent and that said Letters Patent is hereby corrected as shown below:

AT [57] IN THE ABSTRACT

Line 8, "into" should read --onto--.

IN THE DRAWINGS

Sheet 21, Figure 23-1, "AUTMATIC" should read --AUTOMATIC--.

COLUMN 2

Line 44, "view" should read --views--.
Line 66, "and" (first occurrence) should be deleted.

COLUMN 3

Line 8, "photo sensitive" should read --photosensitive--.
Line 10, "photo" should read --photo- --.
Line 11, "photo conductive" should read --photoconductive--.
Line 13, "photo sensitive" should read --photosensitive--.
Line 14, "photo sensitive" should read --photosensitive--.
Line 17, "photo sensitive" should read --photosensitive--.
Line 20, "photo sensitive" should read --photosensitive--.

COLUMN 4

Line 17, "photo" should read --photo- --.
Line 58, "sinc" should read --since--.

UNITED STATES PATENT AND TRADEMARK OFFICE

CERTIFICATE OF CORRECTION

PATENT NO. : 4,745,443

DATED : May 17, 1988

INVENTOR(S) : HIDEKI ADACHI, ET AL.

It is certified that error appears in the above-identified patent and that said Letters Patent is hereby corrected as shown below:

COLUMN 5

Line 27, "WB" should read --W-B--.
Line 31, "siganls" should read --signals--.
Line 52, "$\tan^{-1}\{(\bar{Y}_{MIN.BW}-Y_{MAX.BW})/(\bar{X}_1-\bar{X}_3)\}$" should read --$\tan^{-1}\{(Y_{MIN.BW}-Y_{MAX.BW})/(X_1-X_3)\}$--.
Line 58, "$\tan^{-1}\{(\bar{Y}_{MIN.BW}-\bar{Y}_{MAX.BW})/(\bar{X}_1-\bar{X}_3)\}$" should read --$\tan^{-1}\{(Y_{MIN.BW}-Y_{MAX.BW})/(X_1-X_3)\}$--.

COLUMN 6

Line 11, "rotation" should read --rotation)--.
Line 41, "moto 201." should read --motor 201.--.

COLUMN 7

Line 6, "However" should read --However,--.
Line 55, "photo sensitive" should read --photosensitive--.
Line 59, "photo sensitive" should read --photosensitive--.

COLUMN 9

Line 28, "photo sensitive" should read --photosensitive--.

COLUMN 14

Line 38, "sense" should read --sensing--.

UNITED STATES PATENT AND TRADEMARK OFFICE
CERTIFICATE OF CORRECTION

PATENT NO. : 4,745,443

DATED : May 17, 1988

INVENTOR(S) : HIDEKI ADACHI, ET AL.

It is certified that error appears in the above-identified patent and that said Letters Patent is hereby corrected as shown below:

COLUMN 15

Line 60, "origina" should read --original--.

COLUMN 18

Line 33, "position" should read --position.--.

COLUMN 19

Line 12, "two dimensionallly" should read --two dimensionally--.
Line 32, "An" should read --A--.

COLUMN 20

Line 29, "container" should read --containing--.
Line 34, "container" should read --containing--.

COLUMN 21

Line 3, "comprises" should read --comprise--.
Line 27, "data," should read --datum,--.

COLUMN 22

Line 19, "letter" should read --a letter--.

UNITED STATES PATENT AND TRADEMARK OFFICE

CERTIFICATE OF CORRECTION

PATENT NO. : 4,745,443 Page 4 of 4

DATED : May 17, 1988

INVENTOR(S) : HIDEKI ADACHI, ET AL.

It is certified that error appears in the above-identified patent and that said Letters Patent is hereby corrected as shown below:

COLUMN 23

Line 10, "14, said" should read --14, wherein said--.
Line 26, "An image copying" should read --A copying--.
Line 27, "formation" should be deleted.
Line 29, "An image copying" should read --A copying--.
Line 34, "An image copying" should read --A copying--.
Line 37, "An" should read --A--.
Line 40, "An image forming" should read --A copying--.

COLUMN 24

Line 31, "displays" (first occurrence) should read --display--.

Signed and Sealed this

Twenty-eighth Day of March, 1989

*Attest:*

DONALD J. QUIGG

*Attesting Officer*

*Commissioner of Patents and Trademarks*